(12) United States Patent
Baek et al.

(10) Patent No.: US 11,877,183 B2
(45) Date of Patent: Jan. 16, 2024

(54) METHOD AND DEVICE FOR PERFORMING PACKET DELETION ON BASIS OF LOWER LAYER TRANSMISSION RESULT IN NEXT GENERATION MOBILE COMMUNICATION SYSTEM

(71) Applicant: Samsung Electronics Co., Ltd., Suwon-si (KR)

(72) Inventors: Sangkyu Baek, Suwon-si (KR); Anil Agiwal, Suwon-si (KR); Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 17/414,188

(22) PCT Filed: Jan. 15, 2020

(86) PCT No.: PCT/KR2020/000727
§ 371 (c)(1),
(2) Date: Jun. 15, 2021

(87) PCT Pub. No.: WO2020/149637
PCT Pub. Date: Jul. 23, 2020

(65) Prior Publication Data
US 2021/0329495 A1    Oct. 21, 2021

(30) Foreign Application Priority Data
Jan. 16, 2019 (KR) .......................... 10-2019-0005746

(51) Int. Cl.
*H04W 72/04* (2023.01)
*H04W 28/06* (2009.01)
*H04L 1/1812* (2023.01)

(52) U.S. Cl.
CPC .......... *H04W 28/06* (2013.01); *H04L 1/1819* (2013.01)

(58) Field of Classification Search
CPC ... H04W 28/06; H04W 28/065; H04W 28/04; H04L 1/1819; H04L 1/08; H04L 1/1864; H04L 1/188; H04L 1/1812
See application file for complete search history.

(56) References Cited

U.S. PATENT DOCUMENTS

| 2010/0135216 A1 | 6/2010 | Yi et al. |
| 2016/0198442 A1 | 7/2016 | Suzuki et al. |

(Continued)

FOREIGN PATENT DOCUMENTS

| EP | 1 315 356 A2 | 5/2003 |
| EP | 3 737 154 A1 | 11/2020 |

(Continued)

OTHER PUBLICATIONS

R2-1817324 Spreadtrum Communications, Enhancements for PDCP duplication, 3GPP TSG-RAN WG2 Meeting #104, Spokane, USA, Nov. 12-16, 2018 (Year: 2018).*

(Continued)

*Primary Examiner* — Mahbubul Bar Chowdhury
(74) *Attorney, Agent, or Firm* — Jefferson IP Law, LLP

(57) ABSTRACT

The present disclosure relates to a communication technique for integrating a 5G communication system to support a higher data transmission rate than a 4G system, with IoT technology, and a system therefor. The present disclosure can be applied to intelligent services (for example, smart homes, smart buildings, smart cities, smart cars or connected cars, health care, digital education, retail businesses, security and safety related services, etc.) on the basis of 5G communication technology and IoT related technology. Disclosed is a method for performing packet deletion on the (Continued)

basis of a lower layer transmission result in a next generation mobile communication system.

10 Claims, 27 Drawing Sheets

(56) References Cited

U.S. PATENT DOCUMENTS

| | | | |
|---|---|---|---|
| 2018/0020382 A1 | 1/2018 | Kim et al. | |
| 2018/0279168 A1* | 9/2018 | Jheng | H04L 5/001 |
| 2018/0309660 A1* | 10/2018 | Loehr | H04L 1/08 |
| 2018/0324641 A1 | 11/2018 | Tsai et al. | |
| 2018/0359775 A1 | 12/2018 | Yi et al. | |
| 2018/0367463 A1* | 12/2018 | Jose | H04L 47/32 |
| 2019/0200273 A1* | 6/2019 | Pedersen | H04L 69/22 |
| 2020/0092746 A1 | 3/2020 | Baek et al. | |
| 2020/0120569 A1 | 4/2020 | Baek et al. | |
| 2020/0267793 A1* | 8/2020 | Sharma | H04W 28/02 |
| 2020/0374752 A1 | 11/2020 | Xiao et al. | |

FOREIGN PATENT DOCUMENTS

| | | |
|---|---|---|
| KR | 10-2018-0007697 A | 1/2018 |
| KR | 10-2018-0108389 A | 10/2018 |
| KR | 10-2018-0122951 A | 11/2018 |
| KR | 10-2018-0136898 A | 12/2018 |
| WO | 2017/104981 A1 | 6/2017 |

OTHER PUBLICATIONS

Motorola Mobility, "Correction to MAC UL Data Transfer test cases", R5-182941, 3GPP TSG RAN WG5 #79, Busan, South Korea, May 11, 2018.

European Search Report dated Dec. 6, 2021; European Appln. No. 20740817.0-1205 / 3876594 PCT/KR2020000727.

* cited by examiner

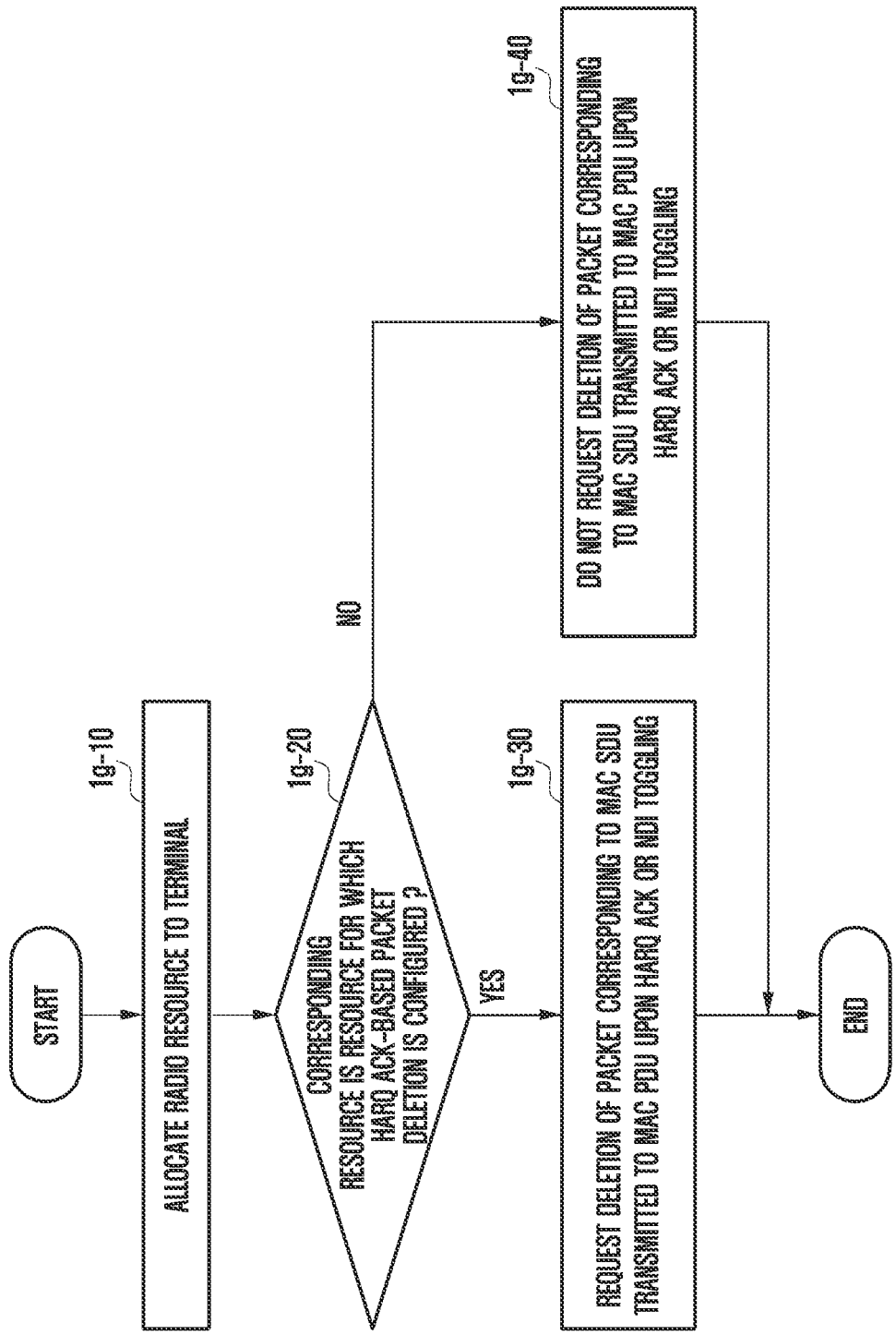

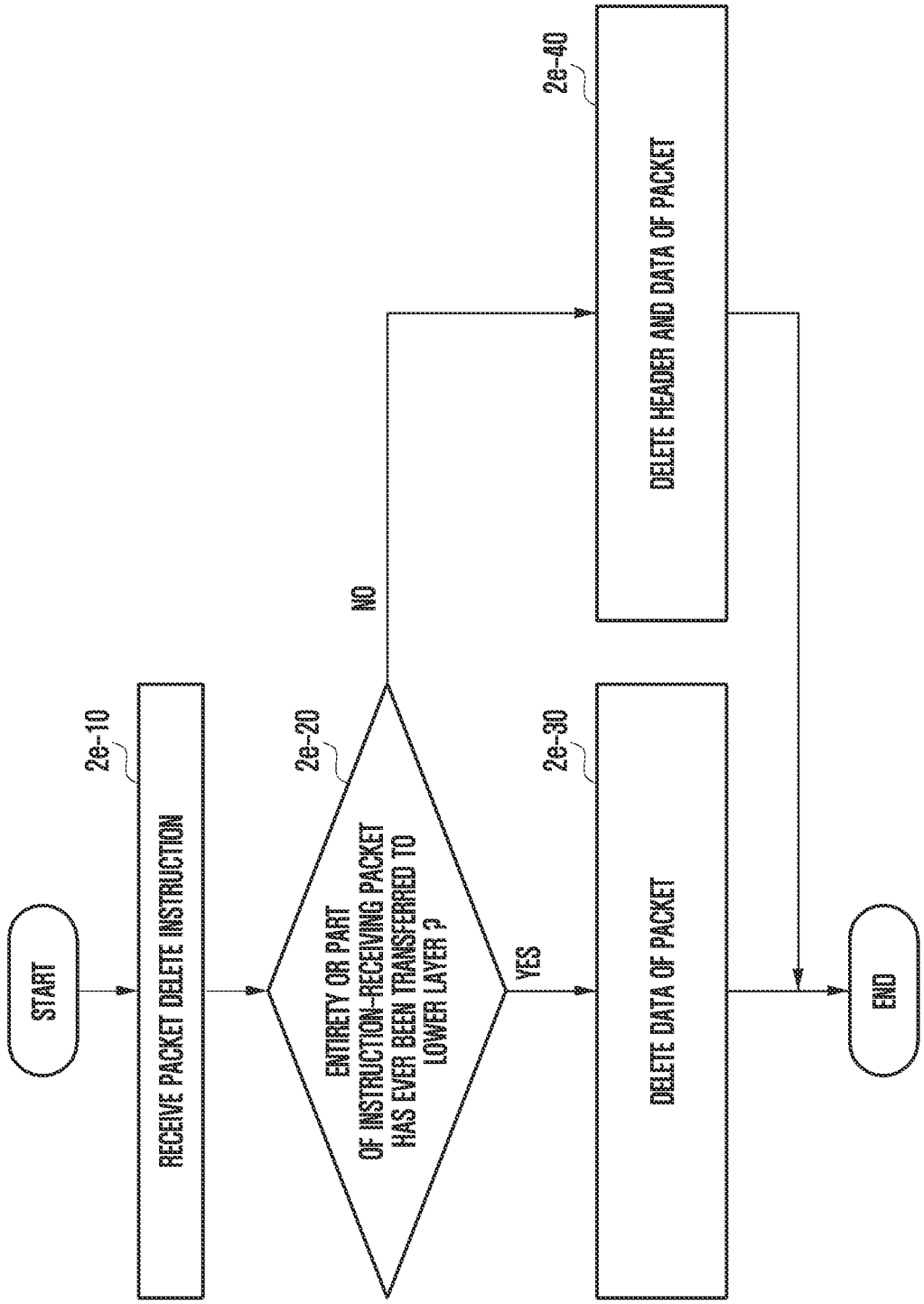

METHOD AND DEVICE FOR PERFORMING PACKET DELETION ON BASIS OF LOWER LAYER TRANSMISSION RESULT IN NEXT GENERATION MOBILE COMMUNICATION SYSTEM

TECHNICAL FIELD

The disclosure relates to a method and a device for performing packet deletion according to a lower-layer transmission result in a next-generation mobile communication system. In addition, the disclosure relates to a method and a device for deleting a data part of a packet in a next-generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Recent development of next-generation mobile communication systems has been followed by extensive research regarding a technology for performing packet deletion according to a lower-layer transmission result and a technology for deleting a data part of a packet. This necessitates operations of a terminal and a base station, which are for the purpose of low latency in a next-generation mobile communication system.

DETAILED DESCRIPTION OF INVENTION

Technical Problem

The disclosure proposes a method for efficiently performing packet deletion according to a lower-layer transmission result in a next-generation mobile communication system. In addition, the disclosure proposes a method for efficiently deleting a data part of a packet in a next-generation mobile communication system.

Solution to Problem

According to an embodiment of the disclosure for solving the above-mentioned technical problems, a method by a transmitter in a communication system may include: generating a first data packet and a second data packet including the same packet data convergence protocol (PDCP) service data unit (SDU); transmitting the first data packet to a receiver; identifying whether the first data packet satisfies a preconfigured condition; and when the first data packet satisfies the preconfigured condition, deleting at least a part of the second data packet based on a state of the second data packet.

In addition, according to an embodiment of the disclosure, a transmitter in a wireless communication system may include: a transceiver; and a controller configured to generate a first data packet and a second data packet including the same packet data convergence protocol (PDCP) service data unit (SDU), transmit the first data packet to a receiver, identify whether the first data packet satisfies a preconfigured condition, and when the first data packet satisfies the preconfigured condition, delete at least a part of the second data packet based on a state of the second data packet.

In addition, according to an embodiment of the disclosure, a method by a receiver in a communication system may include: receiving a first data packet including a packet data convergence protocol (PDCP) service data unit (SDU) from a transmitter; transmitting a hybrid automatic repeat and request (HARQ) acknowledgment (ACK) corresponding to the first data packet or a request for toggling a new data indicator (NDI) to the transmitter; and receiving, from the transmitter, a second data packet generated based on the PDCP SDU, wherein the second data packet does not include the PDCP SDU.

In addition, according to an embodiment of the disclosure, a receiver in a communication system may include: a transceiver; and a controller configured to receive a packet data convergence protocol (PDCP) service data unit (SDU) from a transmitter, transmit a hybrid automatic repeat and request (HARQ) acknowledgment (ACK) corresponding to the first data packet or a request for toggling a new data indicator (NDI) to the transmitter, and receive, from the transmitter, a second data packet generated based on the PDCP SDU, wherein the second data packet does not include the PDCP SDU.

Advantageous Effects of Invention

According to an embodiment of the disclosure, packet deletion may be performed according to a lower-layer transmission result in a next-generation mobile communication system, thereby reducing communication latency between a terminal and a base station.

In addition, according to another embodiment of the disclosure, a data part of a packet may be in a next-generation mobile communication system, thereby reducing communication latency between a terminal and a base station.

BRIEF DESCRIPTION OF DRAWINGS

FIG. 1G illustrates an operation of performing an HARQ ACK-based packet delete operation by a transmitter according to an embodiment of the disclosure;

FIG. 2E illustrates a detailed operation of packet deletion according to an embodiment of the disclosure;

MODE FOR THE INVENTION

Figure 1A:
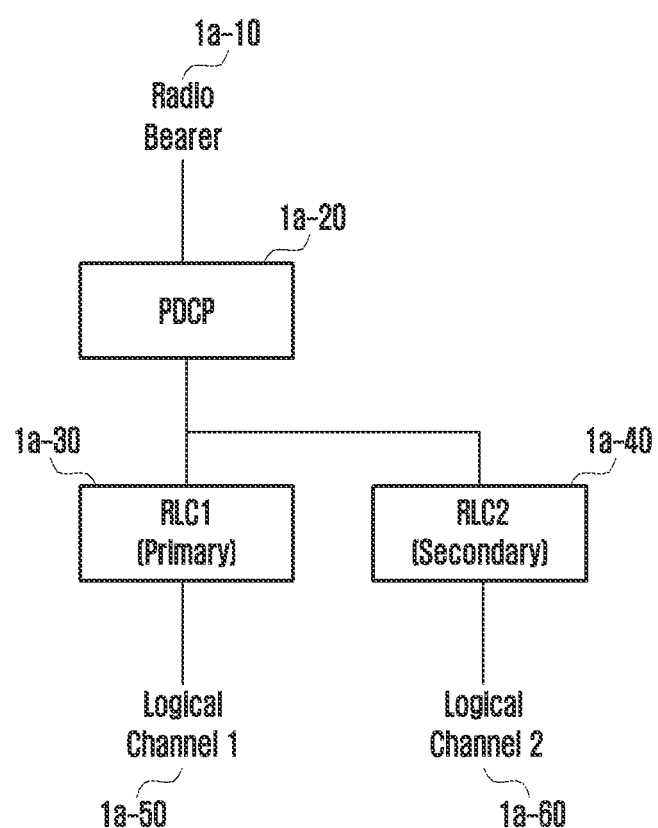
FIG. 1A illustrates a radio bearer structure for duplicate packet transmission according to an embodiment of the disclosure.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

First Embodiment

Hereinafter, in the first embodiment of the disclosure, a method of performing packet deletion according to a transmission result in a lower layer in a next-generation mobile communication system will be described.

FIG. 1A illustrates the structure of a radio bearer 1a-10 for duplicate packet transmission in a wireless communication system according to an embodiment of the disclosure.

Duplicate packet transmission refers to duplicating a packet in a packet data convergence protocol (PDCP) layer 1a-20 of a transmitter, transferring the packet to a plurality of radio link control (RLC) devices 1a-30 and 1a-40, and thus performing transmission through each of logical channels 1a-50 and 1a-60. Here, a packet for which packet duplication is performed may be a service data unit (SDU) of the PDCP layer. The transmitter may be a terminal in a case of uplink transmission and may be a base station in a case of downlink transmission. Hereinafter, the disclosure may be described with reference to some of the drawings under an assumption that a transmitter is a base station and a receiver is a terminal, or that a transmitter is a terminal and a receiver is a base station. However, this does not limit the scope of the disclosure and even a case where the transmitter and the receiver correspond to reversed roles, respectively, may be assumed. In addition, two or more RLC devices may be configured in order to perform duplicate packet transmission. In FIG. 1A, it is assumed that two RLC devices 1a-30 and 1a-40 are configured, but this does not limit the scope of the disclosure.

When the transmitter does not perform duplicate packet transmission, packet duplication is not performed in the PDCP device, packet transmission to a primary RLC device 1a-30 only may occur, and packet transmission to a secondary RLC device 1a-40 may not occur. In another embodiment, data may be transmitted to the primary RLC device only or data may be transmitted to the primary RLC device or the secondary RLC device according to the amount of data to be transmitted from the PDCP device. The RLC devices 1a-30 and 1a-40 shown in FIG. 1A may be configured in the same cell group or different cell groups.

Figure 1B:
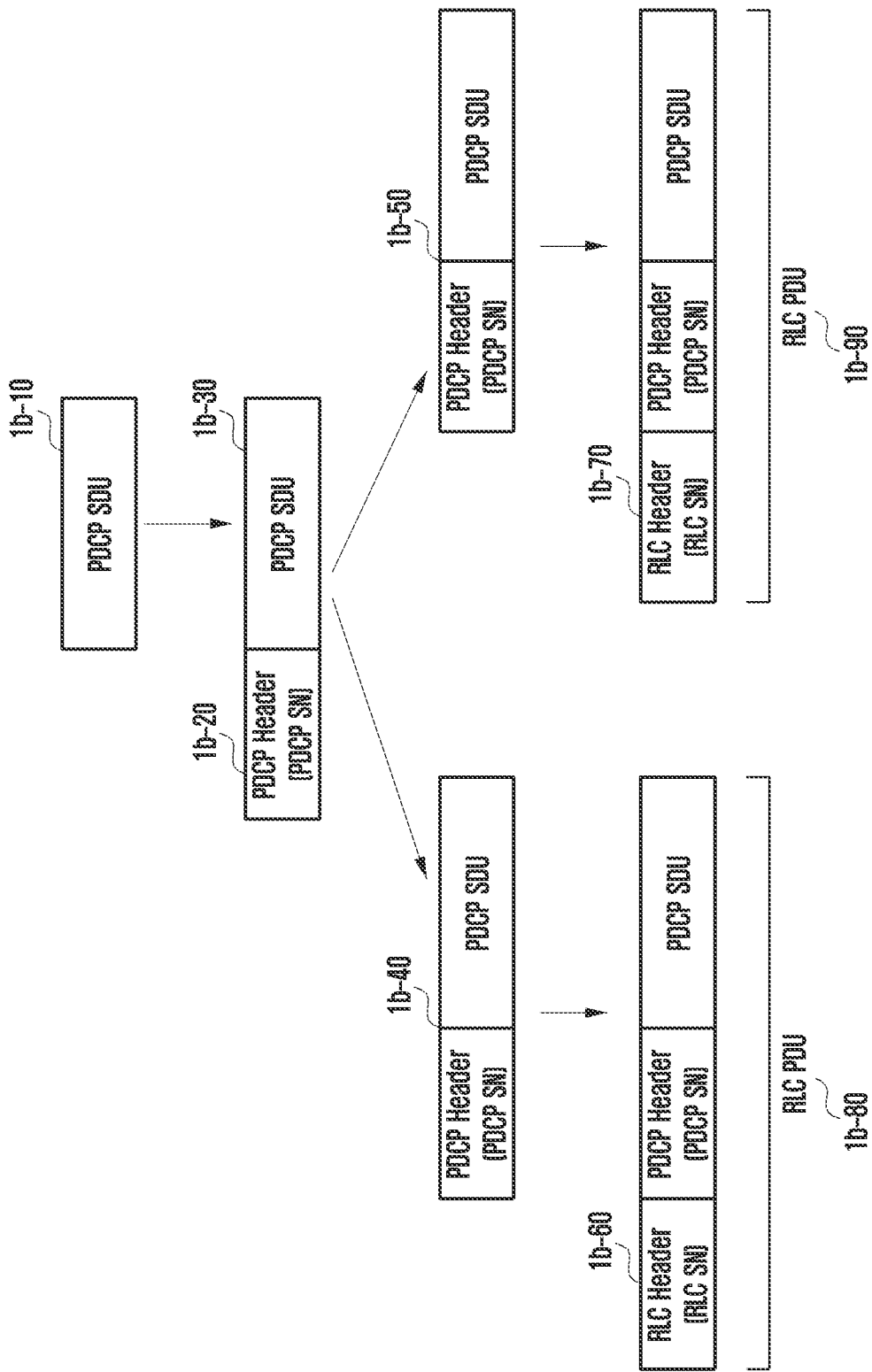
FIG. 1B illustrates a detailed operation in which duplicate packet transmission is performed according to an embodiment of the disclosure.

FIG. 1B illustrates a detailed operation in which duplicate packet transmission is performed according to an embodiment of the disclosure.

When a PDCP SDU 1b-10 is received at the PDCP layer of the transmitter, a PDCP header 1b-20 including a PDCP sequence number (SN) may be added in front of a PDCP SDU 1b-30 before being transmitted to an RLC layer, which is a lower layer. Here, data obtained by combining the PDCP header and PDCP SDU is called a PDCP protocol data unit (PDU). The PDCP SN value of the PDCP header and the PDCP SDU are mapped in one-to-one relationship in the sequence number space.

When duplicate packet transmission is performed in the PDCP layer, the generated PDCP PDU may be duplicated as many times as the number of configured packet duplication. In the embodiment of FIG. 1B, it is assumed that the number of packet duplications is configured as 2, and thus packet duplication is performed for two packets 1b-40 and 1b-50. These duplicated packets are transmitted to at least two RLC devices, respectively, and the at least two RLC devices may be distinguished as at least one primary RLC device and at least one secondary RLC device.

In the respective RLC devices, RLC PDUs 1b-80 and 1b-90, to which RLC headers 1b-60 and 1b-70 including RLC sequence numbers (SN) are added, are generated. Here, respective RLC devices are independent RLC devices, and the same duplicate packet may be assigned different RLC sequence numbers. Here, the transmitter may record a PDCP SN and an RLC SN assigned to each PDCP SDU. To this end, the transmitter may include information for managing the PDCP SN and RLC SN assigned to the PDCP SDU, and the information may be, for example, a table format. The information may include a used Hybrid ARQ (HARQ) process ID and the like in addition to the PDCP SN and RLC SN. For example, in the embodiment of FIG. 1B, the transmitter may record a sequence number assigned to each PDCP SDU and an HARQ process through which transmission of the PDCP SDU has been performed. In the above example, it has been described that a table is configured to manage the PDCP SDU, PDCP SN, RLC SN, and HARQ process ID, but may be implemented in other methods.

Figure 1C:
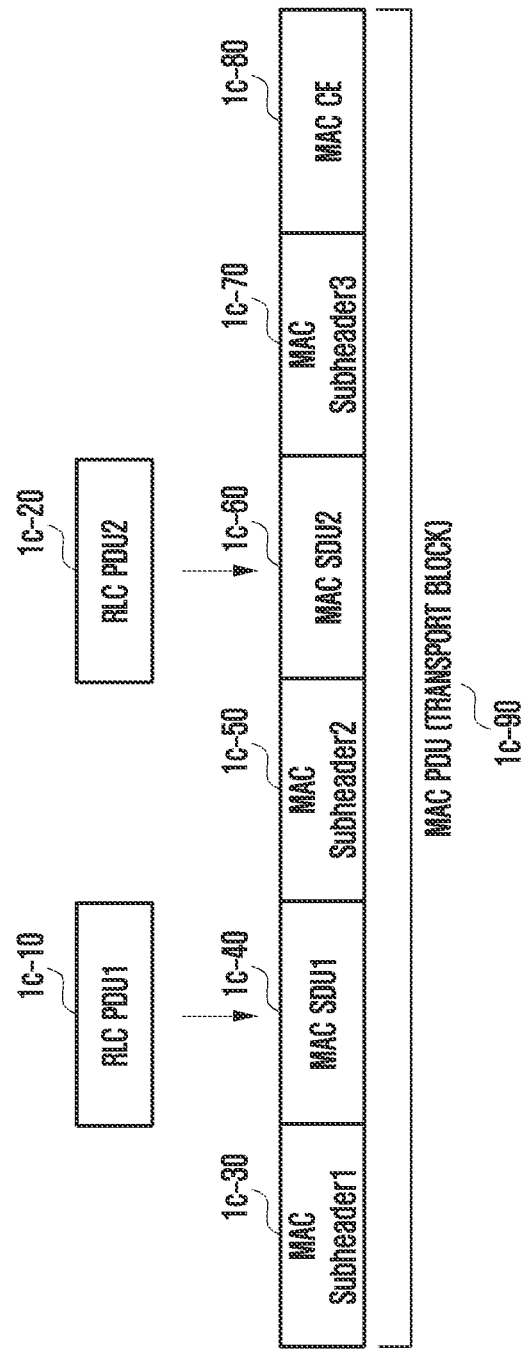
FIG. 1C illustrates an embodiment of an operation of including data in a transport block according to an embodiment of the disclosure.

FIG. 1C illustrates an embodiment of an operation of including data in a transport block according to an embodiment of the disclosure.

The transmitter may transmit data in units of a transport block 1c-90 in order to perform uplink or downlink transmission. RLC PDUs 1c-10 and 1c-20 generated in the RLC layer may correspond to MAC SDUs 1c-40 and 1c-60 in a medium access control (MAC) layer, and MAC sub-headers 1c-30 and 1c-50 may be added in front of MAC SDUs, respectively. The inclusion of the MAC sub-header and the MAC SDU may also be referred to as a MAC sub-PDU. The MAC SDU together with the header may be included in the transport block, and a MAC control element (CE) 1c-80 together with a sub-header 1c-70 of the MAC CE 1c-80 may be included in the transport block. The transport block may be referred to as a MAC PDU in the MAC layer. If a terminal is assigned a MAC PDU in a case of uplink, data and a MAC CE, which need to be included in the transport block, may be determined according to the characteristics of the corresponding MAC PDU. The characteristics of the corresponding MAC PDU may include the following: which cell resource the MAC PDU belongs to; the size of sub-carrier spacing; the size of a PUSCH duration; whether a configured grant is used; and the like. When transmitting the MAC PDU, the transmitter may store RLC SN or PDCP SN information of the RLC SDU included in the MAC PDU. This value may be used to track, when the MAC PDU has been successfully transmitted, which RLC SN or PDCP SN has enabled successful transmission of the corresponding packet.

The 1D illustrates a transceiver operation for HARQ acknowledgment (ACK)-based packet deletion according to an embodiment of the disclosure.

Figure 1D:
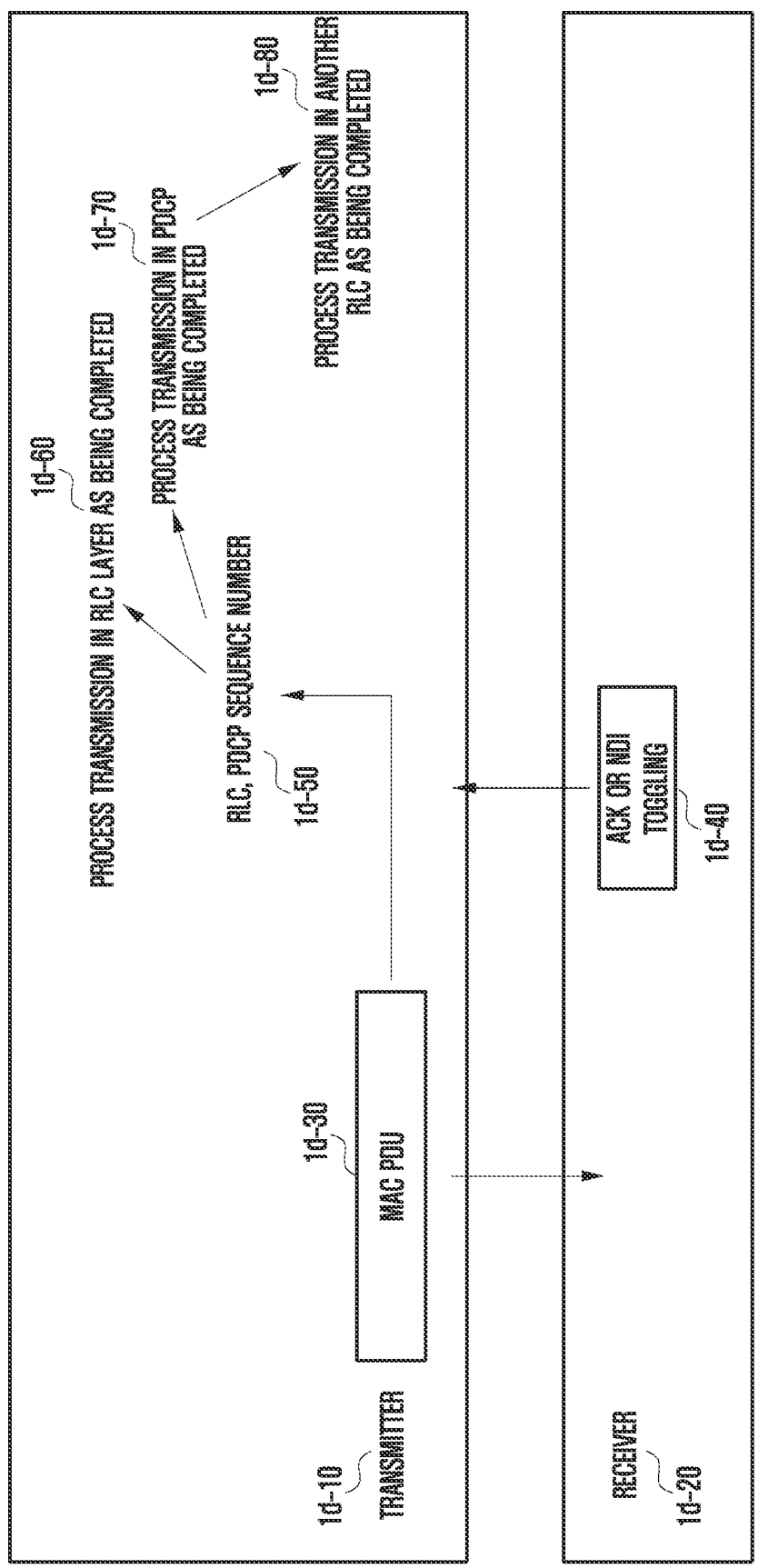
FIG. 1D illustrates an operation of a transceiver for HARQ ACK-based packet deletion according to an embodiment of the disclosure.

The process of transmitting a MAC PDU 1d-30 to a receiver 1d-20 from a transmitter 1d-10 is performed through an HARQ operation. The HARQ is transmitted in units of a transport block, and in the MAC layer, the transport block is the same as the MAC PDU. If the MAC PDU 1d-30 is successfully transmitted to the receiver, the receiver may request transmission of new data by transmitting a HARQ ACK to the transmitter or toggling a new data indicator (NDI) (indicated by reference numeral 1d-40). If there is a radio resource capable of transmitting the HARQ ACK, an indication that MAC PDU transmission has been successful may be transferred using the HARQ ACK, and the NDI toggling may be used only to instruct transmission of new data. When the transmitter receives the HARQ ACK for the transmitted MAC PDU or when the NDI is toggled, the transmitter may transmit data (packet) included in the corresponding MAC PDU, that is, the RLC or PDCP sequence number for the PDCP SDU to the RLC layer or the PDCP layer (indicated by reference numeral 1d-50). To this end, the transmitter may pre-record the PDCP sequence number and RLC sequence number of a data packet, which have been described with reference to FIGS. 1B and 1C, the HARQ process ID included therein, the MAC PDU included therein, and the like. Based on the recording, the transmitter may identify a packet in the MAC layer, of which transmission to the RLC layer or the PDCP layer is successful, the HARQ ACK has been received, or the NDI toggling has been performed. If the RLC device is configured to operate in an acknowledged mode (AM), the sequence number of the RLC PDU included in the successfully transmitted MAC PDU is transferred to the RLC layer and thus transmission in the RLC layer may be processed as being completed (indicated by reference numeral 1d-60). When segmentation of the RLC SDU occurs in the RLC layer, operation 1d-60 may indicate, among the segmented parts, a part for which transmission is successful and thus HARQ ACK is received, or for which NDI toggling is performed. In addition, the sequence number of the PDCP SDU included in the successfully transmitted MAC PDU is transferred to the PDCP layer and thus transmission in the PDCP layer may be processed as being completed (indicated by reference numeral 1d-70). The PDCP SDU, transmission of which has been completed, may be deleted in the PDCP layer. According to an embodiment of the disclosure, an RLC device connected to a logical channel other than a logical channel of a MAC PDU that has been successfully transmitted may be requested to process transmission of an RLC SDU or RLC PDU corresponding to the same PDCP SDU as being completed (indicated by reference numeral 1d-80). Here, instead of the transmission completion processing of the RLC SDU or RLC PDU, the RLC device may be requested to delete the RLC SDU or RLC PDU. In the embodiment of FIG. 1D, transmission completion or SDU/PDU deletion processing in another RLC layer is performed by the HARQ ACK or NDI toggling. The above-described process is referred to herein as HARQ ACK-based packet deletion.

Figure 1E:
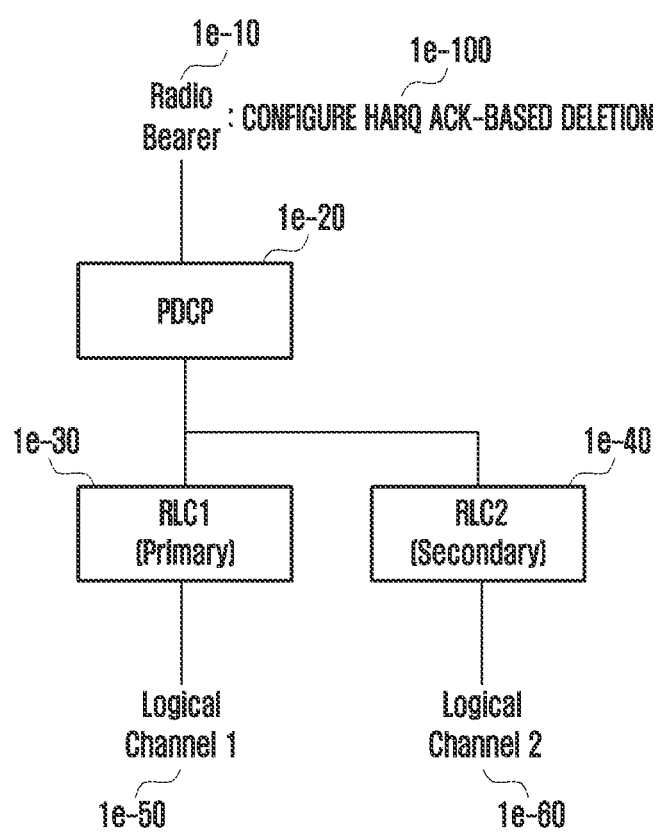
FIG. 1E illustrates a method of configuring a HARQ ACK-based packet delete operation in units of a radio bearer according to an embodiment of the disclosure.

FIG. 1E illustrates a method of configuring a HARQ ACK-based packet delete operation in units of a radio bearer according to an embodiment of the disclosure.

In the embodiment of FIG. 1E, it is assumed that duplicate packet transmission is configured for a radio bearer 1e-10, and to this end, two RLC devices 1e-30 and 1e-40, such as RLC1 and RLC2, are configured in a PDCP device 1e-20. In addition, it is assumed that RLC1 1e-30 is configured as a primary RLC, and RLC2 1e-40 is configured as a secondary RLC. The RLC devices 1e-30 and 1e-40 may be connected to logical channels 1e-50 and 1e-60, respectively. When packet duplication is performed, the HARQ ACK-based packet delete operation cannot always be performed. This is because radio resources for transmitting HARQ ACK are not always allocated, and NDI toggling does not always denote successful transmission. Therefore, in order to perform HARQ ACK-based packet deletion according to an embodiment of the disclosure, a radio resource for HARQ ACK is configured or an appointment is made between a transmitter and a receiver so that HARQ ACK-based packet deletion can be performed in the case of NDI toggling. To this end, the embodiment of FIG. 1E proposes a method of configuring HARQ ACK-based packet deletion for each radio bearer. In this case, an information element (IE) for configuring HARQ ACK-based packet deletion may be included upon configuration of each radio bearer 1e-10, and thus HARQ ACK-based packet deletion may be configured in units of a radio bearer (indicated by reference numeral 1e-100). If the transmitter is a base station, the HARQ ACK-based packet deletion configuration for each radio bearer as described above may be configured through, for example, an RRC configuration message transmitted to a terminal by the base station.

Figure 1F:
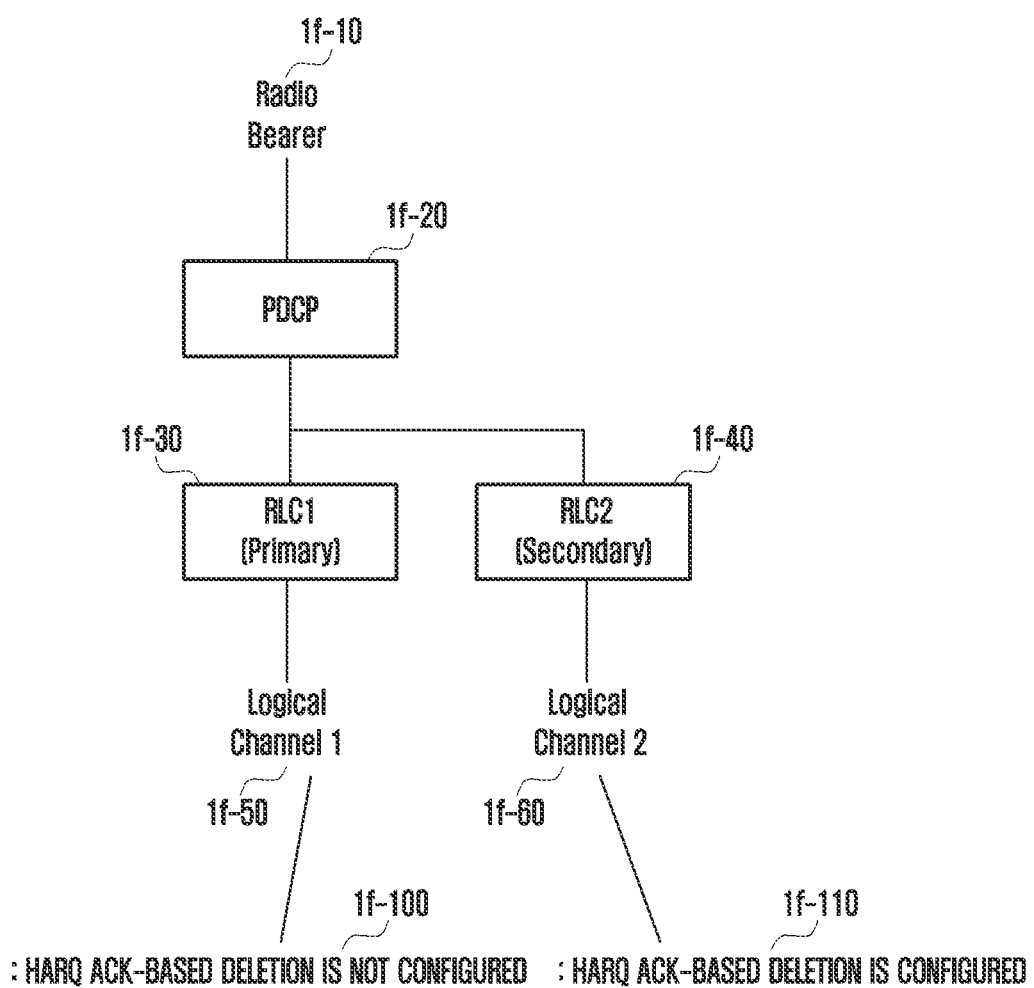
FIG. 1F illustrates a method of configuring a HARQ ACK-based packet delete operation in units of a logical channel according to an embodiment of the disclosure.

FIG. 1F illustrates a method of configuring a HARQ ACK-based packet delete operation in units of a logical channel according to an embodiment of the disclosure.

In the embodiment of FIG. 1F, it is assumed that duplicate packet transmission is configured for a radio bearer 1f-10, and to this end, two RLC devices 1f-30 and 1f-40, such as RLC1 and RLC2, are configured in a PDCP device 1f-20. In addition, it is assumed that RLC1 1f-30 is configured as a primary RLC, and RLC2 1f-40 is configured as a secondary RLC. The RLC devices 1f-30 and 1f-40 may be connected to logical channels 1f-50 and 1f-60, respectively. When packet duplication is performed, the HARQ ACK-based packet delete operation cannot always be performed. This is because radio resources for transmitting HARQ ACK are not always allocated, and NDI toggling does not always denote successful transmission. Therefore, in order to perform HARQ ACK-based packet deletion according to an embodiment of the disclosure, a radio resource for HARQ ACK is configured, or an appointment is made between a transmitter and a receiver so that HARQ ACK-based packet deletion can be performed in the case of NDI toggling. To this end, the embodiment of FIG. 1F proposes a method of configuring HARQ ACK-based packet deletion for each logical channel. In this case, an information element (IE) for configuring HARQ ACK-based packet deletion may be included upon configuration of respective logical channels 1f-50 and 1f-60, and thus HARQ ACK-based packet deletion may be configured in units of a logical channel (indicated by reference numerals 1f-100 and 1f-110).

In the embodiment of FIG. 1F, logical channel 1 1f-50 indicates that HARQ ACK-based packet deletion is not configured (indicated by reference numeral 1f-100), and logical channel 2 1f-60 indicates that HARQ ACK-based packet deletion is configured (indicated by reference numeral 1f-110). When HARQ ACK-based packet deletion is configured in logical channel 2 1f-60 as shown in FIG. 1F, if a packet is successfully transmitted through logical channel 2, an RLC device connected to logical channel 1 1f-50 may be requested to perform transmission completion processing or deletion of an RLC SDU or RLC PDU corresponding to the same PDCP SDU. When the transmitter is a base station, the HARQ ACK-based packet deletion configuration for each logical channel as described above may be configured through, for example, an RRC configuration message transmitted to the terminal by the base station.

It has been described above with reference to FIGS. 1E and 1F that HARQ ACK-based packet deletion is configured in units of a radio bearer or a logical channel, but this is for illustration only, and does not limit the scope of the disclosure. Hereinafter, HARQ ACK-based packet deletion may be configured in units of a random radio resource unit including a radio resource to be described later according to a similar method in this specification.

FIG. 1G illustrates an operation of performing an HARQ ACK-based packet delete operation by a transmitter according to an embodiment of the disclosure.

The embodiment of FIG. 1G shows that HARQ ACK-based packet deletion is performed on a radio resource for which HARQ ACK-based packet deletion is previously configured according to the method described with reference to FIG. 1E or 1F.

Here, the radio resource may include at least one of the following features.

Applying HARQ ACK-based packet deletion to a resource allocated to a specific cell Applying HARQ ACK-based packet deletion to a specific configured grant configuration Applying HARQ ACK-based packet deletion to a specific subcarrier spacing Applying HARQ ACK-based packet deletion to a radio resource allocated using a specific C-RNTI (e.g., a resource allocated using MCS-C-RNTI)

Applying HARQ ACK-based packet deletion to a resource allocated using a specific HARQ process ID Applying HARQ ACK-based packet deletion to a radio resource indicated by a specific service indicator (e.g., a resource indicated by an ultra-reliable and low latency communication (URLLC) indicator)

Applying HARQ ACK-based packet deletion to data of a specific radio bearer

Applying HARQ ACK-based packet deletion to data of a specific logical channel (RLC device)

Applying HARQ ACK-based packet deletion to data for which a HARQ ACK feedback resource (channel) for uplink data is configured Applying HARQ ACK-based packet deletion to data for which a HARQ ACK feedback resource (channel) for downlink data is configured A radio resource, to which HARQ ACK-based packet deletion is applied, may be configured through, for example, an RRC configuration message, if the transmitter is a base station.

When a radio resource is allocated to a terminal (indicated by reference numeral 1g-10), the base station may identify whether the allocated resource is a resource for which HARQ ACK-based packet deletion described above has been configured (indicated by reference numeral 1g-20). If the allocated resource is a resource for which HARQ ACK-based packet deletion has been configured, the transmitter may notify a higher layer, such as RLC or PDCP, of successful transmission of packets (at least one of MAC SDU, RLC SDU, RLC PDU, PDCP SDU, and PDCP PDU) corresponding to the MAC PDU when the HARQ ACK is received or NDI is toggled, and may request deletion in the RLC or PDCP layer. Here, the HARQ ACK-based packet delete operation described above may be performed (indicated by reference numeral 1g-30). Otherwise, if the HARQ ACK-based packet deletion is not configured for the resource, the higher layer is not notified of the successful packet transmission to the MAC PDU even when the HARQ ACK is received or NDI is toggled. Therefore, the HARQ ACK-based deletion operation for the corresponding packet is not performed (indicated by reference numeral 1g-40).

Figure 1H:
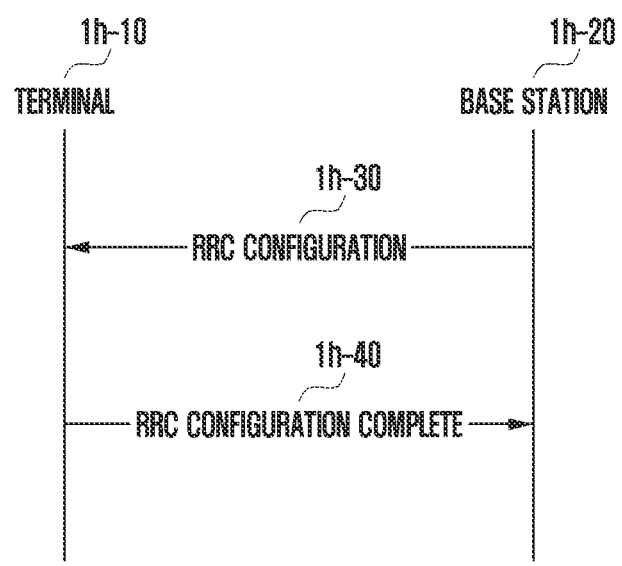
FIG. 1H illustrates a procedure of configuring HARQ ACK-based packet deletion according to an embodiment of the disclosure.

FIG. 1H illustrates a procedure of configuring HARQ ACK-based packet deletion according to an embodiment of the disclosure.

A radio resource for HARQ ACK may be configured in order to perform HARQ ACK-based packet deletion or an appointment may be made between a transmitter and a receiver so that HARQ ACK-based packet deletion can be performed in the case of NDI toggling. To this end, a terminal 1h-10 may receive configuration of the HARQ ACK-based packet deletion from a base station 1h-20. The configuration may be an RRC configuration message 1h-30 transmitted from the base station to the terminal According to an embodiment, the RRC configuration message may be an RRC reconfiguration message. The RRC configuration message may include information for indicating a radio resource to perform HARQ-based packet deletion. Here, the radio resource may be at least one of the following features.

Applying HARQ ACK-based packet deletion to a resource allocated to a specific cell Applying HARQ ACK-based packet deletion to a specific configured grant configuration Applying HARQ ACK-based packet deletion to a specific subcarrier spacing Applying HARQ ACK-based packet deletion to a radio resource allocated using a specific C-RNTI (e.g., a resource allocated using an MCS-C-RNTI)

Applying HARQ ACK-based packet deletion to a resource allocated using a specific HARQ process ID Applying HARQ ACK-based packet deletion to a radio resource indicated by a specific service indicator (e.g., a resource indicated by an ultra-reliable and low latency communication (URLLC) indicator)

Applying HARQ ACK-based packet deletion to data of a specific radio bearer

Applying HARQ ACK-based packet deletion to data of a specific logical channel (RLC device)

Applying HARQ ACK-based packet deletion to data for which a HARQ ACK feedback resource (channel) for uplink data is configured Applying HARQ ACK-based packet deletion to data for which a HARQ ACK feedback resource (channel) for downlink data is configured When the terminal completes a configuration by applying the received RRC configuration message 1h-30, the terminal may transmit an RRC configuration complete message 1h-40 to the base station to notify that the configuration is complete.

Figure 1I:
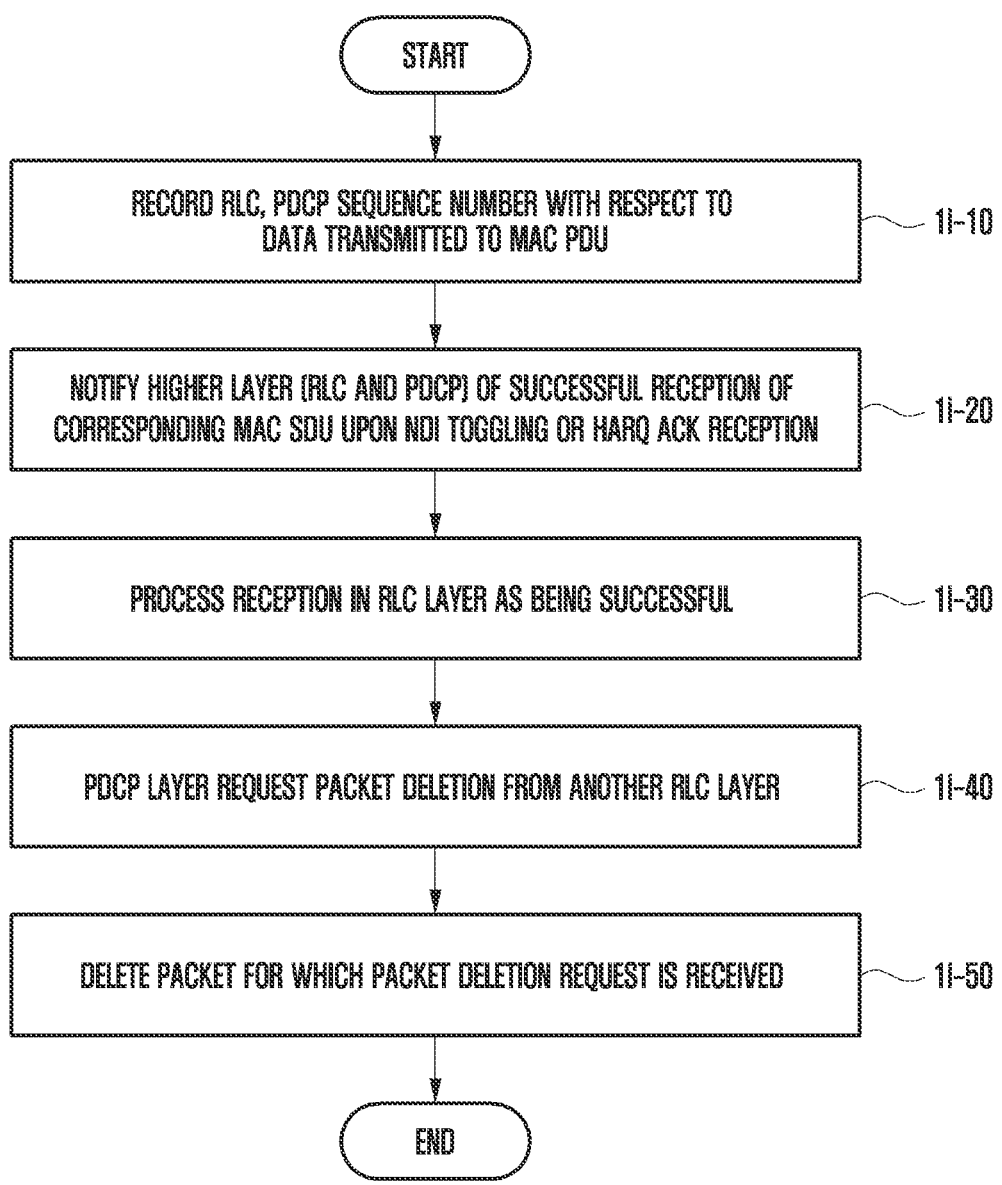
FIG. 1I illustrates a transmitter operation for HARQ ACK-based packet deletion according to an embodiment of the disclosure.

FIG. 1I illustrates a transmitter operation for HARQ ACK-based packet deletion according to an embodiment of the disclosure.

In order to perform a HARQ ACK-based packet deletion operation, a transmitter needs to know a packet, which has been transmitted to a MAC PDU corresponding to HARQ ACK or NDI toggling. To this end, an RLC sequence number or a PDCP sequence number of a data packet transmitted to the MAC PDU may be recorded (operation 1i-10). These sequence numbers are connected to the HARQ process ID and may be used when HARQ ACK or NDI toggling occurs in the corresponding HARQ process. According to an embodiment, the transmitter may record sequence numbers for all pieces of data of all logical channels, or may record sequence numbers only for radio resources for which HARQ ACK-based packet deletion is configured. Thereafter, when the NDI is toggled or the HARQ ACK is received with respect to the corresponding MAC PDU, the transmitter may notify a higher layer (RLC layer or PDCP layer) of successful transmission of a MAC SDU included in the corresponding MAC PDU (operation 1i-20). Based on this information, in the RLC layer, transmission of the RLC PDU included in the successfully transmitted MAC PDU may be processed as being completed (operation 1i-30), and in the PDCP layer, transmission of a PDCP SDU included in the successfully transmitted MAC PDU may be processed as being completed, using the sequence number of the PDCP SDU. Here, in the PDCP layer, the PDCP SDU, transmission of which has been completed, may be deleted. According to an embodiment, an RLC device, which is connected to a logical channel other than a logical channel of the successfully transmitted MAC PDU (for which the NDI is toggled or a HARQ ACK is received), may be requested to process transmission of an RLC SDU or RLC PDU corresponding to the same PDCP SDU as being completed, or may be requested to delete the RLC SDU or RLC PDU (operation 1i-40). The RLC layer having received the transmission completion processing request or the delete request may delete the corresponding packet (operation 1i-50). If the entirety or a part of the packet, having received the transmission completion processing request or the delete request, has ever been transferred to a lower layer, the packet may not be deleted in order to avoid a gap in the sequence number. According to an embodiment, instead of deleting the entire packet, only a data part of the packet may be deleted and only a header part may be transmitted.

Figure 1J:
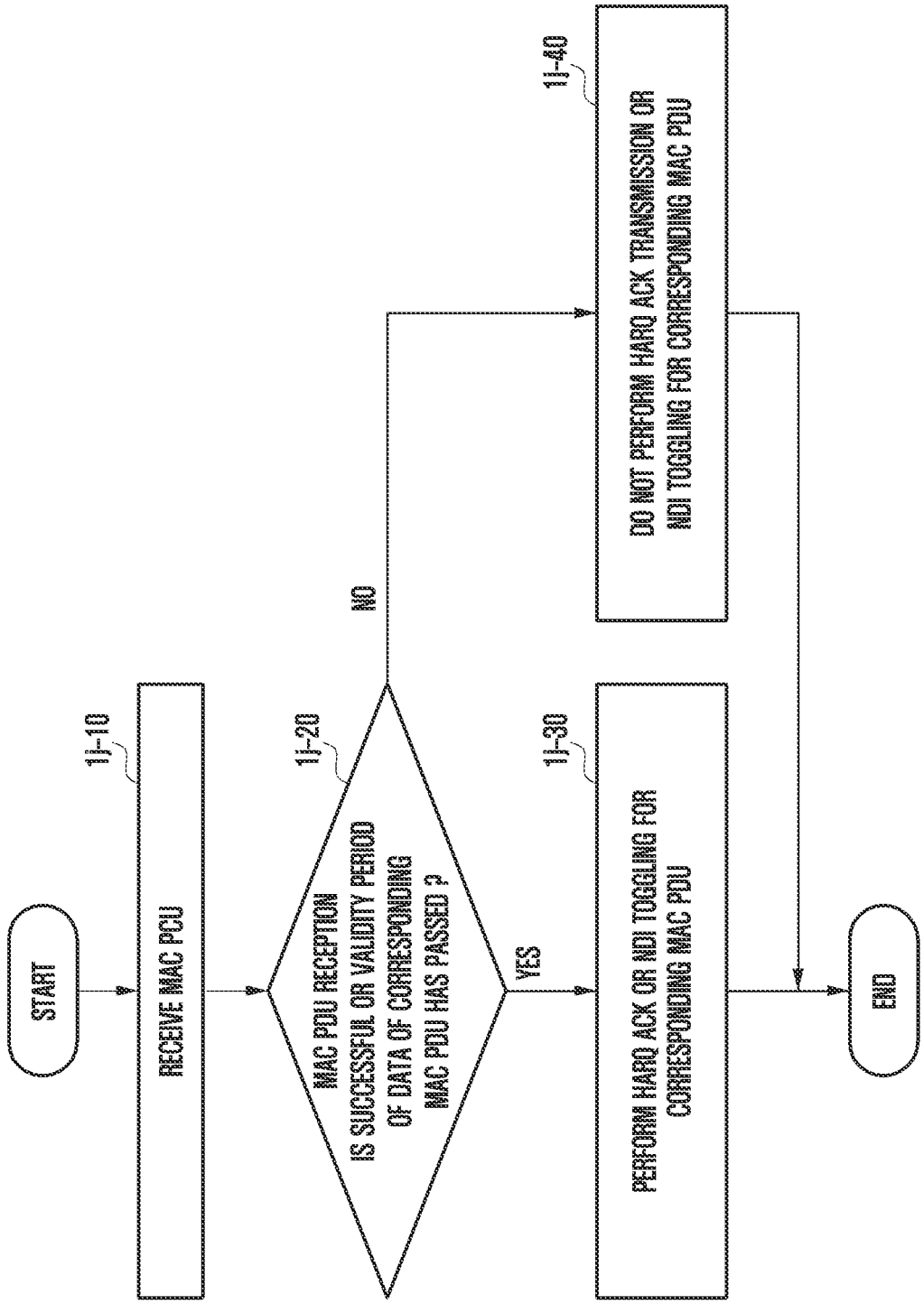
FIG. 1J illustrates a receiver operation for HARQ ACK-based packet deletion according to an embodiment of the disclosure.

FIG. 1J illustrates a receiver operation for HARQ ACK-based packet deletion according to an embodiment of the disclosure.

The HARQ ACK-based packet delete operation by the transmitter may be performed when NDI toggling or HARQ ACK transmitted from a receiver occurs due to successful packet transmission, or when data included in the corresponding MAC PDU is no longer valid data. To this end, when the MAC PDU is received (operation 1$j$-10), the receiver may identify whether the corresponding MAC PDU has been successfully received or whether the validity period of the data of the corresponding MAC PDU has passed (operation 1$j$-20). If the MAC PDU has been successfully received or it is identified that the valid period of the data of the corresponding PDU has passed, the receiver may transmit HARQ ACK to the corresponding MAC PDU or toggle the NDI for the same HARQ process (operation 1$j$-30). Otherwise, if the MAC PDU is not successfully received and it is not identified that the validity period of the data included in the corresponding MAC PDU has passed, the receiver may not transmit the HARQ ACK to the corresponding MAC PDU, or may not toggle the NDI (operation 1$j$-40).

Figure 1K:
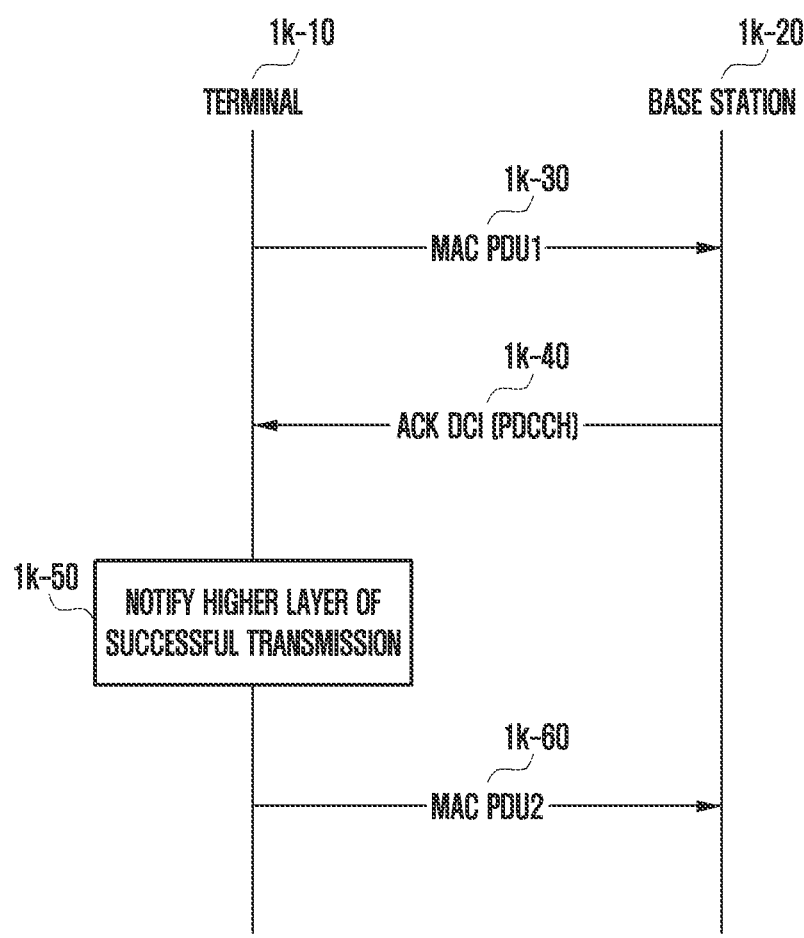
FIG. 1K illustrates a procedure of a transceiver operation for HARQ ACK-based packet deletion according to an embodiment of the disclosure.

FIG. 1K illustrates a procedure of a transceiver operation for HARQ ACK-based packet deletion according to an embodiment of the disclosure.

FIG. 1K illustrates an embodiment of uplink transmission in which a terminal 1$k$-10 transmits data to a base station 1$k$-20. In order for the terminal to perform the HARQ ACK-based packet deletion operation, the terminal needs to know a packet, which is transmitted to a MAC PDU 1$k$-30 corresponding to HARQ ACK or NDI toggling. To this end, an RLC sequence number or a PDCP sequence number of a data packet transmitted to the MAC PDU may be recorded. These sequence numbers are connected to the HARQ process ID and may be used when HARQ ACK or NDI toggling occurs in the corresponding HARQ process. According to an embodiment, the terminal may record sequence numbers for all pieces of data of all logical channels, or the terminal may record the sequence numbers only for radio resources for which HARQ ACK-based packet deletion has been configured. When the base station successfully receives the MAC PDU after transmission of the MAC PDU (indicated by reference numeral 1$k$-30), the base station notifies the terminal that the MAC PDU has been successfully transmitted, through HARQ ACK or NDI toggling (operation 1$k$-40). Here, the HARQ ACK may be transmitted by allocation of a separate radio resource, or may be transmitted using a field of DCI transmitted through a physical downlink control channel (PDCCH). According to an embodiment, successful transmission may be notified of by toggling the NDI field of DCI, instead of HARQ ACK. Accordingly, the terminal notifies a higher layer, that is, the RLC or PDCP layer, of successful transmission of a packet included in the corresponding MAC PDU (operation 1$k$-50). Here, the stored RLC sequence number or PDCP sequence number may be used. The terminal may receive radio resource allocation by the DCI received in operation 1$k$-40 and receive a new transmission indication, and may transmit a new MAC PDU to the base station by using a radio resource indicated by the corresponding DCI (operation 1$k$-60).

Figure 1L:
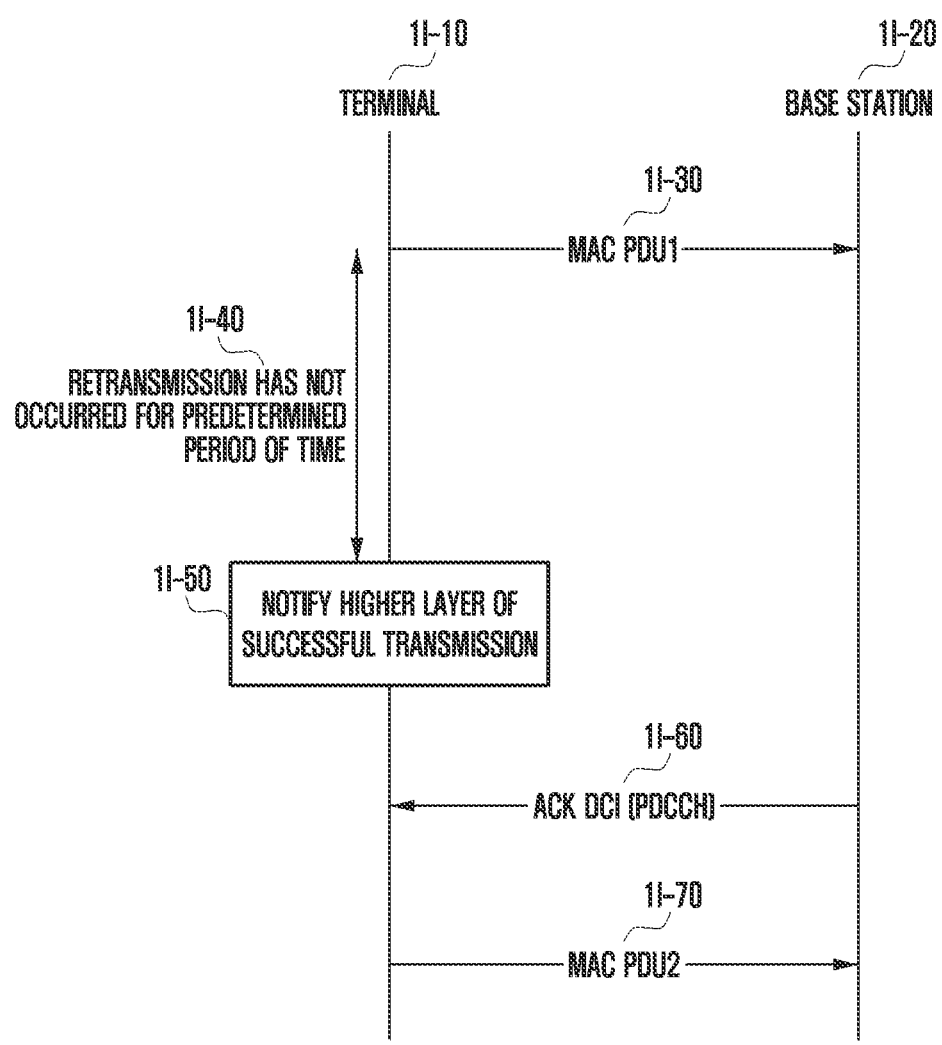
FIG. 1L illustrates a procedure of a transceiver operation for HARQ ACK-based packet deletion according to another embodiment of the disclosure.

FIG. 1L illustrates a procedure of a transceiver operation for HARQ ACK-based packet deletion according to another embodiment of the disclosure.

FIG. 1L illustrates an embodiment of uplink transmission in which a terminal 1$l$-10 transmits data to a base station 1$l$-20. In order for the terminal to perform an HARQ ACK-based packet deletion operation, the terminal needs to know a packet, which is transmitted to a MAC PDU 1$l$-30 corresponding to HARQ ACK or NDI toggling. To this end, an RLC sequence number or a PDCP sequence number of a data packet transmitted to the MAC PDU may be recorded. These sequence numbers are connected to the HARQ process ID and may be used when HARQ ACK or NDI toggling occurs in the corresponding HARQ process. In the embodiment of FIG. 1L, even if retransmission has not occurred for a predetermined period of time (indicated by reference numeral 1$l$-40) after transmission of the MAC PDU (indicated by reference numeral 1$l$-30), it is determined as a situation corresponding to HARQ ACK or NDI toggle, and the terminal notifies a higher layer, that is, the RLC or PDCP layer, of successful transmission of the packet included in the corresponding MAC PDU. Here, the stored RLC sequence number or PDCP sequence number may be used (indicated by reference numeral 1$l$-50). Thereafter, the terminal may receive radio resource allocation by DCI and receive a new transmission indication (indicated by reference numeral 1$l$-60). Thereafter, the terminal may transmit a new MAC PDU to the base station by using a radio resource indicated by the corresponding DCI (indicated by reference numeral 1$l$-70).

Figure 1M:
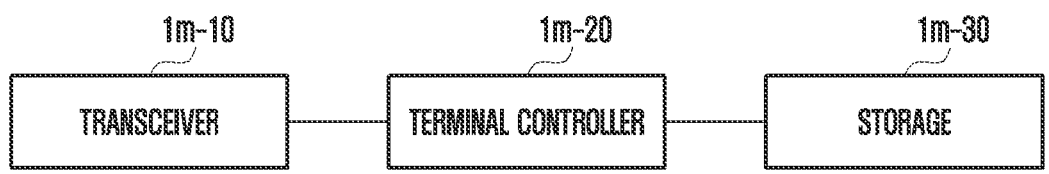
FIG. 1M illustrates the structure of a terminal according to an embodiment of the disclosure.

FIG. 1M illustrates the structure of a terminal according to an embodiment of the disclosure.

Referring to FIG. 1M, the terminal may include a transceiver 1$m$-10, a controller 1$m$-20, and a storage 1$m$-30. In the disclosure, the controller may be defined as a circuit, an application-specific integrated circuit, or at least one processor.

The transceiver 1$m$-10 may transmit or receive signals to or from another network entity. The transceiver 1$m$-10 may receive system information from a base station, for example, and may receive a synchronization signal or a reference signal.

The controller 1$m$-20 may control the overall operation of the terminal according to the embodiment proposed in the disclosure. For example, the controller 1$m$-20 may control a signal flow between blocks to perform an operation according to the above-described flowchart.

The storage 1$m$-30 may store at least one of information transmitted or received through the transceiver 1$m$-10 and information generated through the controller 1$m$-20.

Figure 1N:
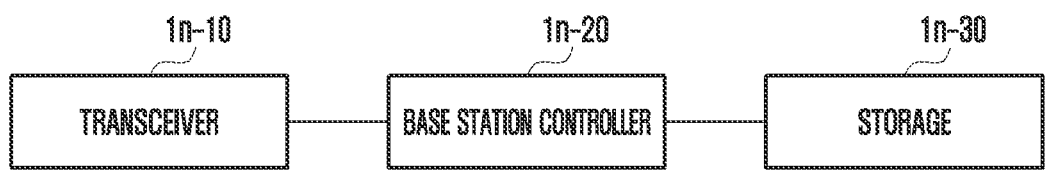
FIG. 1N illustrates a structure of a base station according to an embodiment of the disclosure.

FIG. 1N illustrates the structure of a base station according to an embodiment of the disclosure.

Referring to FIG. 1N, the base station may include a transceiver 1$n$-10, a controller 1$n$-20, and a storage 1$n$-30. In the disclosure, the controller 1$n$-20 may be defined as a circuit, an application-specific integrated circuit, or at least one processor.

The transceiver 1$n$-10 may transmit or receive signals with another network entity. The transceiver 1$n$-10 may transmit system information to the terminal, for example, and may transmit a synchronization signal or a reference signal.

The controller 1$n$-20 may control the overall operation of the base station according to the embodiment proposed in the disclosure. For example, the controller 1$n$-20 may control a signal flow between blocks to perform an operation according to the above-described flow chart.

The storage 1$n$-30 may store at least one of information transmitted or received through the transceiver 1$n$-10 and information generated through the controller 1$n$-20.

Second Embodiment

Hereinafter, in the second embodiment of the disclosure, a method of deleting a data part of a packet according to a transmission result in a lower layer in a next-generation mobile communication system will be described.

Figure 2A:
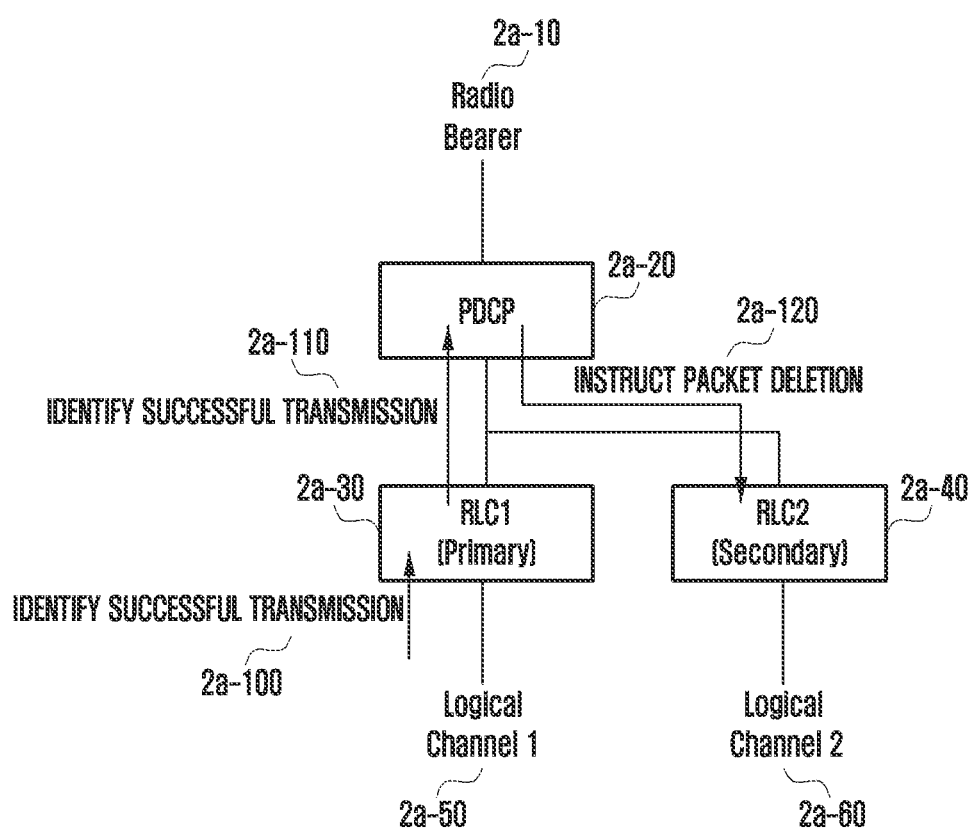
FIG. 2A illustrates an operation of deleting a successfully transmitted packet in a radio bearer structure for duplicate packet transmission according to an embodiment of the disclosure.

FIG. 2A illustrates an operation of deleting a successfully transmitted packet in the structure of a radio bearer 2a-10 for packet duplication transmission according to an embodiment of the disclosure.

Duplicate packet transmission refers to duplicating a packet in a packet data convergence protocol (PDCP) layer 2a-20 of a transmitter, transferring the packet to a plurality of radio link control (RLC) devices 2a-30 and 2a-40, and thus performing transmission through respective logical channels 2a-50 and 2a-60. Here, a packet, for which packet duplication is performed, may be a service data unit (SDU) of the PDCP layer. The transmitter may be a terminal in a case of uplink transmission and may be a base station in a case of downlink transmission. Hereinafter, the disclosure may be described with reference to some of the drawings under an assumption that a transmitter is a base station and a receiver is a terminal, or that a transmitter is a terminal and a receiver is a base station. However, this does not limit the scope of the disclosure and even a case where the transmitter and the receiver correspond to reversed roles, respectively, may be assumed. In addition, two or more RLC devices may be configured in order to perform duplicate packet transmission. In FIG. 2A, it is assumed that two RLC devices 2a-30 and 2a-40 are configured, but this does not limit the scope of the disclosure.

When the transmitter does not perform duplicate packet transmission, packet duplication is not performed in the PDCP device, data transmission to a primary RLC device 2a-30 only may occur, and packet transmission to a secondary RLC device 2a-40 may not be performed. In another embodiment, data may be transmitted to the primary RLC device only or to the primary RLC device or the secondary RLC device according to the amount of data to be transmitted from the PDCP device. The RLC devices 2a-30 and 2a-40 shown in FIG. 2A may be configured in the same cell group or different cell groups.

If successful packet transmission is performed through at least one RLC device, transmission of the same packet through another RLC device in duplicate packet transmission may not be necessary. Accordingly, in this case, if the same packet is to be transmitted to another RLC device, transmission of the corresponding packet may be canceled.

In the embodiment of FIG. 2A, it is assumed that successful transmission of a packet transmitted through logical channel 1 2a-50 in RLC1 2a-30 is identified (indicated by reference numeral 2a-100). The identification of successful transmission can be made through successful transmission information included in an RLC status report message, successful transmission information by HARQ ACK or NDI toggling, or an indication that HARQ retransmission is not requested for a predetermined period of time. The successful transmission information may be transferred from the RLC layer to the PDCP layer (indicated by reference numeral 2a-110). However, in another embodiment, the PDCP status report message may be used to directly transfer successful transmission information to the PDCP layer without relay of the RLC layer. In still another embodiment, successful transmission information of a MAC PDU in a MAC layer may be transferred to the PDCP layer without relay of the RLC layer. In the PDCP layer, when an indication of successful transmission of a packet from at least one RLC or MAC layer is received, it is possible to direct another RLC device, instead of the RLC device in which the successful transmission has occurred, to delete the same packet (indicated by reference numeral 2a-120). Here, the same packet refers to data including the same PDCP SDU, which is duplicated in the PDCP layer and transferred to the RLC layer. In the RLC layer, having received an indication of packet deletion, the corresponding packet may be deleted. However, if the corresponding packet is already being transmitted or there is a possibility that a problem may occur in the operation of a lower layer including the RLC layer, the corresponding packet may not be deleted.

Figure 2B:
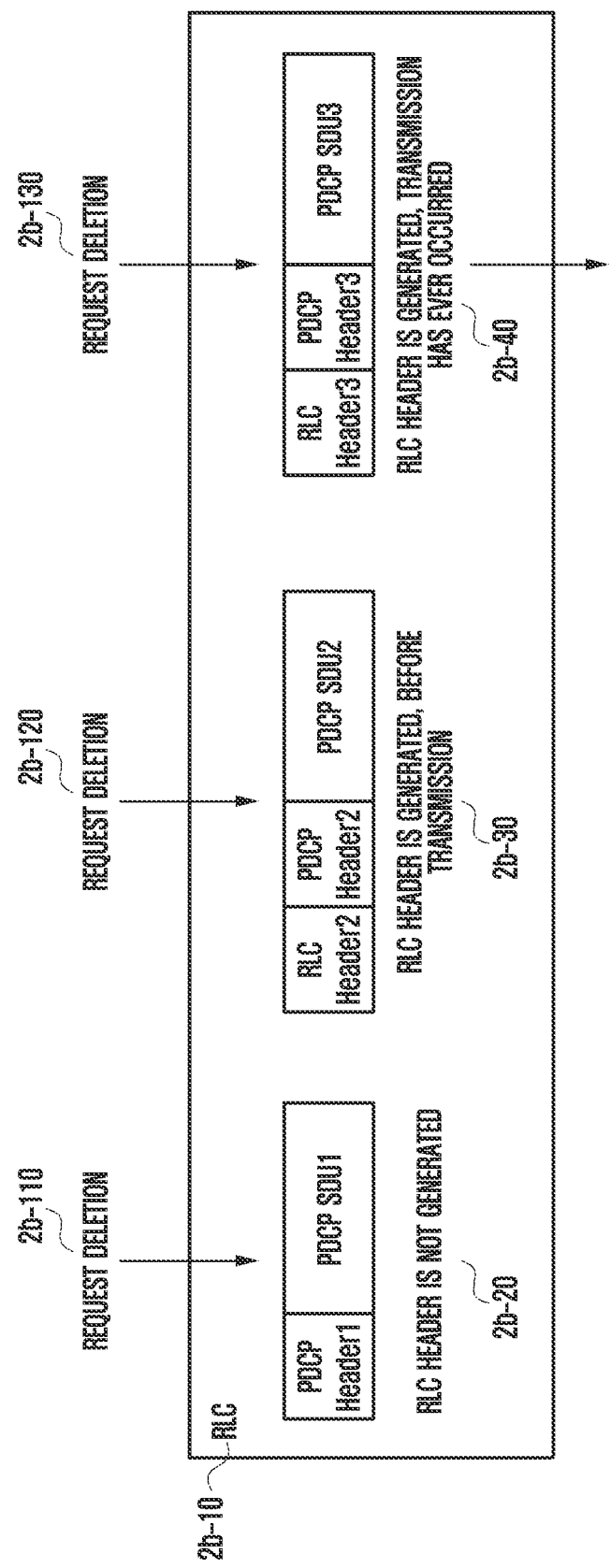
FIG. 2B illustrates a packet state of an RLC layer when a delete request is received from a PDCP layer according to an embodiment of the disclosure.

FIG. 2B illustrates a packet state of an RLC layer when a delete request is received from a PDCP layer according to an embodiment of the disclosure.

Packets possessed by an RLC layer 2b-10 may be largely divided into three types of packets.

First, there may be a packet transmitted as it is from the PDCP layer, including a PDCP SDU and a PDCP header (indicated by reference numeral 2b-20). An additional header is not added to the packet in the RLC layer, and the packet has never been transferred to the medium access control (MAC) layer, which is a lower layer. When a request to delete the packet is received from the PDCP layer (indicated by reference numeral 2b-110), the RLC layer and another lower layer are not affected even if the corresponding packet is deleted, and thus the deletion can be performed as it is.

Next, there may be a packet received through the PDCP layer, including the PDCP SDU and the PDCP header, and to which the RLC header is added, the entirety or a part of the packet having never been transferred to a lower layer (indicated by reference numeral 2b-30). Since the entirety or a part of the packet has never been transferred to a lower layer, this packet may be a packet that is not actually transmitted. When a request to delete the packet is received from the PDCP layer (indicated by reference numeral 2b-120), the lower layer of the RLC layer may not be affected even if the packet is deleted. However, since a header has already been generated in the RLC layer and a sequence number has been allocated accordingly, a gap in the sequence number may occur when the packet is deleted. Therefore, when the corresponding packet is deleted, the RLC layer may be affected. Therefore, in order to delete the packet, overwriting of the RLC header is required, such as deleting the RLC header of the corresponding packet and re-assigning the corresponding sequence numbers to other packets. Since rewriting of the header increases the number of memory accesses, the rewriting may cause performance degradation, such as lowering the processing speed of the transmitter.

Finally, there may be a packet received through the PDCP layer, including the PDCP SDU and the PDCP header, and to which the RLC header is added, the entirety or a part of the packet having ever been transferred to a lower layer (indicated by reference numeral 2b-40). Since the entirety or a part of the packet has ever been transferred to a lower layer, this packet may be a packet that actually transmitted. When a request to delete the packet is received from the PDCP layer (indicated by reference numeral 2b-130), packet deletion should not be performed in a random manner because the packet deletion may affect the RLC layer and the lower layer. In the RLC layer, since a header has already been generated and a sequence number is allocated accordingly, a gap in sequence number may occur when a packet is deleted. Therefore, when a corresponding packet is deleted, the RLC layer may be affected. Therefore, in order to delete the packet, overwriting of the RLC header is required, such as deleting the RLC header of the corresponding packet and re-assigning the corresponding sequence numbers to other packets. Since rewriting of the header increases the number of memory accesses, the rewriting may cause performance degradation, such as lowering the processing speed of the transmitter. In addition, since an operation of HARQ transmission and the like may be continuously performed in the lower layer, it is not possible to direct the lower layer to perform deletion.

The disclosure proposes a method which, when data, transmitted through one logical channel in a radio bearer for which duplicate packet transmission has been configured, is successfully transmitted, does not affect the operation of the RLC layer or lower layer while requesting deletion of the same packet from another RLC layer and deleting unnecessary data of a packet for which the RLC header is generated.

Figure 2C:
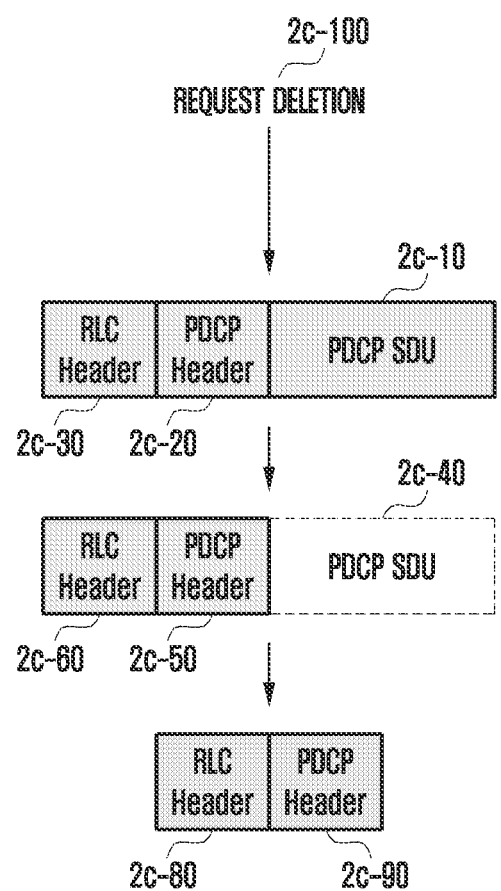
FIG. 2C illustrates a packet delete operation according to an embodiment of the disclosure.

FIG. 2C illustrates a packet delete operation according to an embodiment of the disclosure.

If a packet stored in the RLC layer includes a PDCP SDU 2c-10, a PDCP header 2c-20, and an RLC header 2c-30, when a request to delete the packet is received from the PDCP layer (indicated by reference numeral 2c-100), the packet may no longer need to be transmitted to the receiver. However, since the PDCP header 2c-50 and the RLC header 2c-60 have already been generated, and the PDCP sequence number and the RLC sequence number have been generated accordingly, all data including the header can not be deleted. However, in this case, the PDCP SDU part 2c-40, which is a pure data part, may be deleted. If the corresponding data part is deleted, the packet actually transmitted may include only an RLC header 2c-80 and a PDCP header 2c-90. If the RLC SDU (PDCP SDU and PDCP header) is segmented in the RLC layer, a segment info (SI) field, which is a 2-bit indicator including segmentation information, may be changed to have a value of "00" to indicate that segmentation does not occur. In another embodiment, the SI field may be changed to have one value among "01", "10", or "11" values other than a value of "00" and transmitted. Accordingly, the RLC device of the receiver may determine, based on a promised SI field value, that a packet, which does not include a PDCP SDU, is a packet from which the PDCP SDU has been deleted. According to an embodiment, transmission of the packet that does not include the PDCP SDU may be used only to perform packet deletion through successful transmission of data through another logical channel in a bearer in which duplicate packet transmission is configured.

Figure 2D:
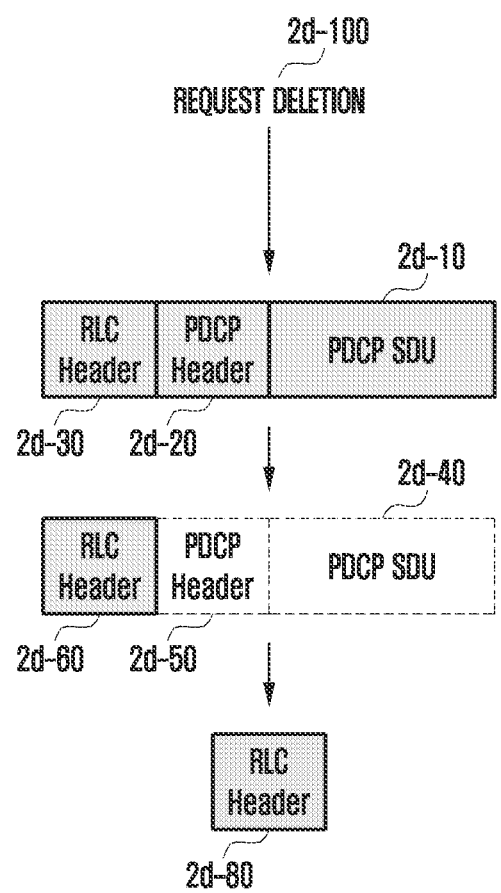
FIG. 2D illustrates a packet delete operation according to another embodiment of the disclosure.

FIG. 2D illustrates a packet delete operation according to another embodiment of the disclosure.

If a packet stored in the RLC layer includes a PDCP SDU 2d-10, a PDCP header 2d-20, and an RLC header 2d-30, when a request to delete the packet is received from the PDCP layer (indicated by reference numeral 2d-100), the packet no longer needs to be transmitted to the receiver. However, since the RLC header 2d-60 has already been generated, all data including the header cannot be deleted. However, in this case, a PDCP SDU part 2d-40 and an RLC header part 2d-50, which are pure data parts, may be deleted. When the data part is deleted, the packet actually transmitted includes only an RLC header 2d-80. If the RLC SDU (PDCP SDU and PDCP header) is segmented in the RLC layer, a segment info (SI) field, which is a 2-bit indicator including segmentation information, may be changed to have a value of "00" to indicate that segmentation does not occur. In another embodiment, the SI field may be changed to have one value among "01", "10", or "11" values other than a value of "00" and transmitted. Accordingly, the RLC device of the receiver may determine, using a promised SI field value, that a packet, which does not include a PDCP SDU, is a packet from which the PDCP SDU has been deleted. According to an embodiment, the packet that does not include the PDCP SDU may be used only to perform packet deletion due to successful transmission of data transmitted through another logical channel in a bearer in which duplicate packet transmission is configured.

FIG. 2E illustrates a detailed operation of a packet delete operation according to an embodiment of the disclosure.

When a packet deletion instruction for a packet, included in the RLC device, is received from the PDCP layer (operation 2e-10), the RLC device may determine a part of the packet that needs to be deleted. To this end, it is possible to identify whether a packet, which has been instructed to be deleted, that is, the entirety or a part of the RLC SDU (a combination of a PDCP header and a PDCP SDU) has ever been transferred to a lower layer (operation 2e-20). If the entirety or a part of the packet that has been instructed to be deleted has ever been transferred to a lower layer, only the data part of the packet may be deleted without deleting the header part of the packet (operation 2e-30). Here, the header part remaining after deletion of data part may be transmitted continuously. The data referred to in operation 2e-30 may correspond to only the PDCP SDU as described in the description of FIG. 2C, or may correspond to the RLC SDU including the PDCP SDU and the PDCP header as described in the description of FIG. 2D. If the entirety or a part of the packet, having received the deletion instruction, has never been transferred to the lower layer, all of the header part and the data part of the packet can be deleted (operation 2e-40). According to an embodiment, the method of deleting only the data part described in FIG. 2E may be performed only in an RLC device of a radio bearer in which duplicate packet transmission is configured.

Figure 2F:
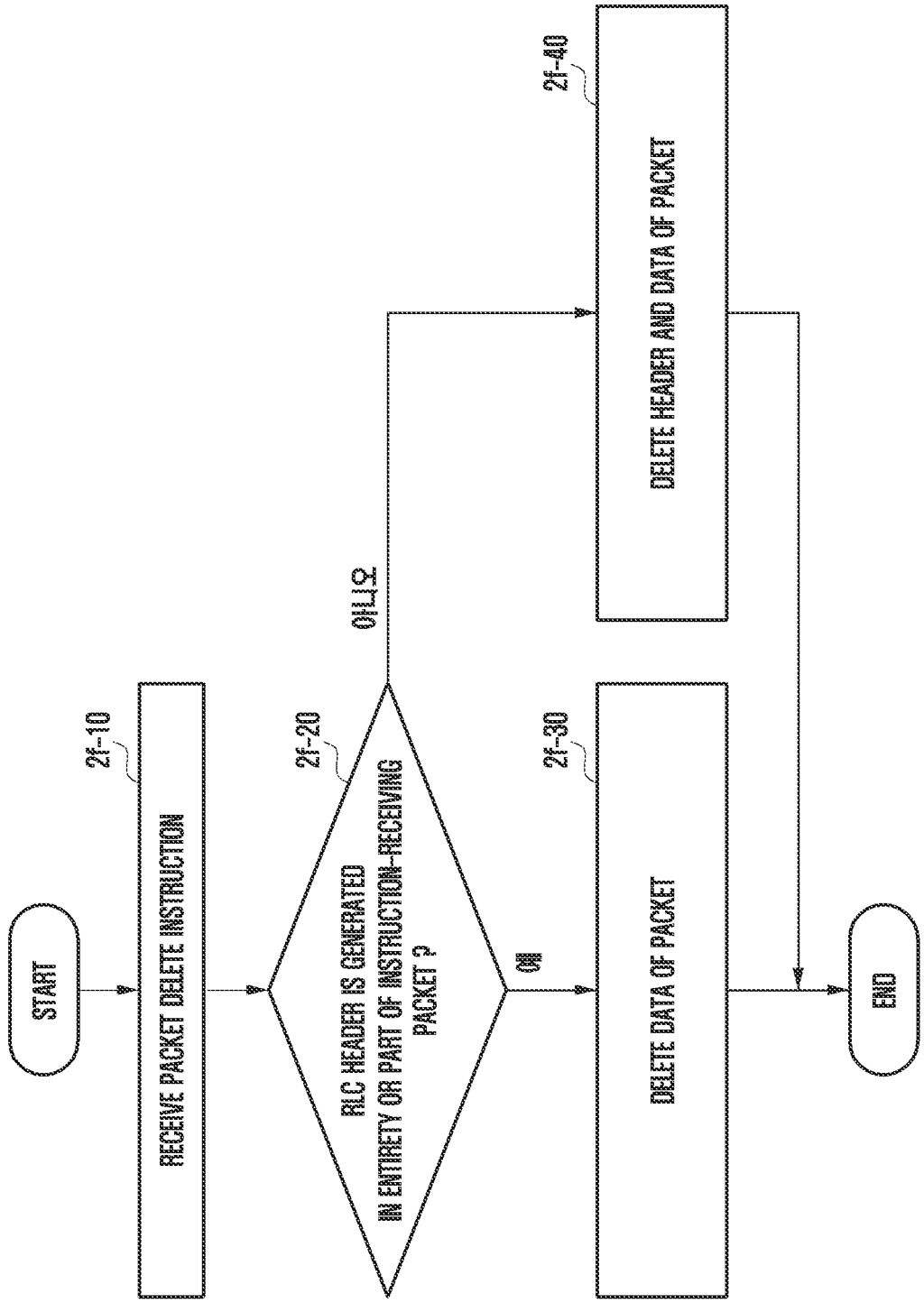
FIG. 2F illustrates a detailed operation of packet deletion according to another embodiment of the disclosure.

FIG. 2F illustrates a detailed operation of a packet delete operation according to another embodiment of the disclosure.

When a packet deletion instruction for a packet included in the RLC device is received from the PDCP layer (operation 2f-10), the RLC device may determine a part of the packet that needs to be deleted. To this end, it is possible to identify whether an RLC header is generated in the packet, which has been instructed to be deleted, that is, in the RLC SDU (a combination of a PDCP header and a PDCP SDU) (operation 2f-20). According to an embodiment, instead of a condition that an RLC header has been generated, a condition relating to whether an RLC sequence number has been allocated may be identified. If the RLC header is generated in the entirety or a part of the packet for which the deletion instruction is received, only the data part of the packet can be deleted without deleting the header part of the packet (operation 2f-30). Here, the header part remaining after deletion of the data part can be transmitted continuously. The data referred to in operation 2f-30 may correspond to only the PDCP SDU as described in the description of FIG. 2C, or may correspond to the RLC SDU including the PDCP SDU and the PDCP header as described in the description of FIG. 2D. If the RLC header is not generated in the entirety or a part of the packet for which the deletion instruction is received, all of the header part and the data part of the packet can be deleted (operation 2f-40). According to an embodiment, the method of deleting only the data part described in FIG. 2F may be performed only in the RLC device of a radio bearer in which duplicate packet transmission is configured.

Figure 2G:
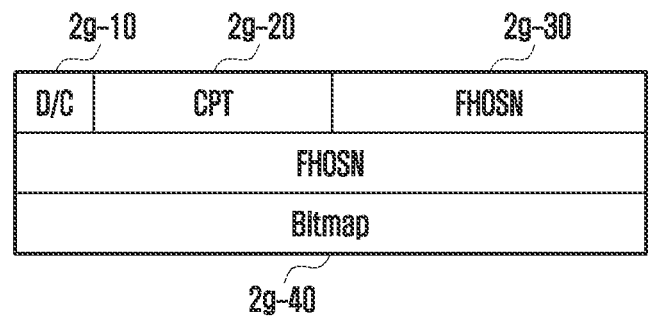
FIG. 2G illustrates a control PDU format for transmitting deletion information to a receiver when only a data part of a packet is deleted according to an embodiment of the disclosure.

FIG. 2G illustrates a format of a control PDU (control packet) for transmitting deletion information to a receiver when only a data part of a packet is deleted according to an embodiment of the disclosure.

As described in FIGS. 2C, 2D, 2E, and 2F, when the RLC layer receives an instruction to delete a packet, if the entirety or a part of the packet has ever been transferred to the lower layer, or if the RLC header has already been generated, only the data part of the packet can be deleted. This is performed to process transmission of a packet, from which data is deleted, as being completed, by transferring the sequence number information included in the RLC header or the PDCP header to the RLC device or the PDCP device of the receiver. However, if multiple packets are deleted and a large number of packets having only a header without a data part are transmitted, radio resources for transmission of the header may be wasted. In order to prevent a waste of radio resources, a control protocol data unit (PDU) may be generated instead of multiple packets, and corresponding information may be transmitted to the receiver.

FIG. 2G illustrates an embodiment of a format of a control PDU for performing transmission by including the information therein. The format of the embodiment of FIG. 2G includes a first header-only sequence number (FHOSN) field 2g-30 indicating the sequence number of the first packet from which the data part has been deleted, and a bitmap field 2g-40 indicating the location of another packet from which the data part has been deleted. For example, if the sequence numbers of packets from which the data parts are deleted are "10", "11", and "13", the FHOSN field may be recorded as "10", which indicates the sequence number of the first packet among the deleted packets, and the bitmap field may be recorded as "10100000". In the bitmap field, "1" indicates that the data part of a packet has been deleted, and "0" indicates that the same has not been deleted. The bitmap field may be in a unit of bytes, that is, a bit length in multiples of 8. In the embodiment of FIG. 2G, the FHOSN field has been recorded as the sequence number of the first packet among packets from which the data parts have been deleted. However, in another embodiment, the FHOSN field is recorded as the sequence number of the last packet among packets from which the data parts have been deleted, and whether to delete the data parts of packets having previous sequence numbers may be indicated in bits in the bitmap. In addition, since a data/control (D/C) field 2g-10 is a field indicating whether the corresponding PDU is a data PDU or a control PDU, and the packet of FIG. 2G is a control PDU, the D/C field may always be configured as a value indicating the control PDU. A control PDU type (CPT) field 2g-20 is a field indicating a type of control PDU of the corresponding packet, and the packet of FIG. 2G may have a value indicating a control PDU notifying of information of a deleted packet.

Whether to use the control packet as shown in FIG. 2G may be configured through an RRC configuration message when a corresponding radio bearer or logical channel is configured or reconfigured. According to an embodiment, the corresponding control packet may be applied only to a packet of a radio bearer in which duplicate packet transmission is configured. In addition, the corresponding control packet may be applied when a preconfigured condition is satisfied, for example, when a packet from which N or more data parts are deleted is generated. According to an embodiment, the value of N may be an integer of 1 or 2 or more. When the receiver receives the control PDU shown in FIG. 2G, the receiver may process a packet, from which the data part indicated in the control PDU has been deleted, as being received. According to an embodiment, the value of N is pre-configured to instruct deletion of data parts of N packets, and thus the bitmap field may be omitted.

Figure 2H:
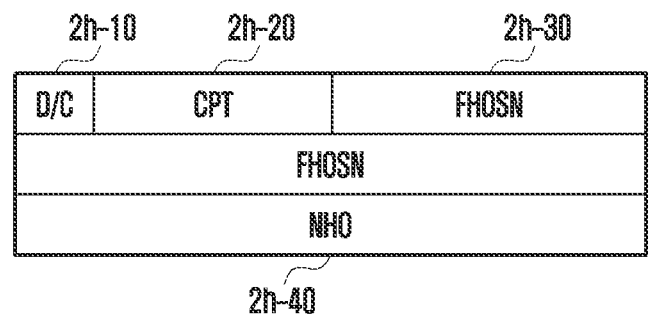
FIG. 2H illustrates a control PDU format for transmitting deletion information to a receiver when only a data part of a packet is deleted according to another embodiment of the disclosure.

FIG. 2H illustrates a format of a control PDU (control packet) for transmitting deletion information to a receiver when only a data part of a packet is deleted according to another embodiment of the disclosure.

As described in FIGS. 2C, 2D, 2E, and 2F, when the RLC layer receives an instruction to delete a packet, if the entirety or a part of the packet has ever been transferred to the lower layer, or if the RLC header has already been generated, only the data part of the packet can be deleted. This is performed to process transmission of a packet, from which data is deleted, as being completed, by transferring the sequence number information included in the RLC header or the PDCP header to the RLC device or the PDCP device of the receiver. However, if multiple packets are deleted and a large number of packets having only a header without a data part are transmitted, radio resources for transmission of the header may be wasted. In order to prevent a waste of radio resources, a control protocol data unit (PDU) may be generated, instead of multiple packets, so as to transmit corresponding information to the receiver.

FIG. 2H shows another embodiment of a format of a control PDU for performing transmission by including the information therein. The format of the embodiment of FIG. 2H includes a first header-only sequence number (FHOSN) field 2h-30 indicating the sequence number of the first packet among packets from which the data part has been deleted, and a number of header-only packets (NHO) field 2g-40 indicating the number of deleted packets, ranging from a packet having the FHOSN value as the sequence number thereof. For example, if the sequence numbers of packets from which the data parts have been deleted are "10", "11", "12", and "13", the FHOSN field may be recorded as "10", which is the sequence number of the first packet among packets from which the data parts have been deleted, and the NHO field may be recorded as 3, which is the number of data corresponding to the sequence numbers "11", "12", and "13". In FIG. 2H, it is assumed that the NHO field has a length of 8 bits, but it may be different depending on a configuration. In the embodiment of FIG. 2H, the FHOSN field is recorded as the sequence number of the first packet among packets from which the data parts have been deleted. However, in another embodiment, the sequence number of the last packet among packets from which data parts have been deleted may be recorded for the FHOSN field. In addition, since a data/control (D/C) field 2h-10 is a field indicating whether the corresponding PDU is a data PDU or a control PDU, and the packet of FIG. 2H is a control PDU, the D/C field may always be configured as a value indicating the control PDU. A control PDU type (CPT) field 2h-20 is a field indicating a type of control PDU of the corresponding packet, and the packet of FIG. 2H may have a value indicating a control PDU notifying of information of a deleted packet.

Whether to use the control packet as shown in FIG. 2H may be configured through an RRC configuration message when a corresponding radio bearer or logical channel is configured or reconfigured. According to an embodiment, the corresponding control packet may be applied only to a packet of a radio bearer in which duplicate packet transmission is configured. In addition, the corresponding control packet may be applied when a preconfigured condition is satisfied, for example, when N or more packets, from which data parts are deleted, are generated. According to an embodiment, the value of N may be an integer of 1, or 2 or more. When the receiver receives the control PDU shown in FIG. 2H, reception of a packet, from which the data part indicated in the control PDU has been deleted, may be processed as being completed. According to an embodiment, the value of N is pre-configured to instruct deletion of data parts of N packets, and thus the NHO field may be omitted.

Figure 2I:
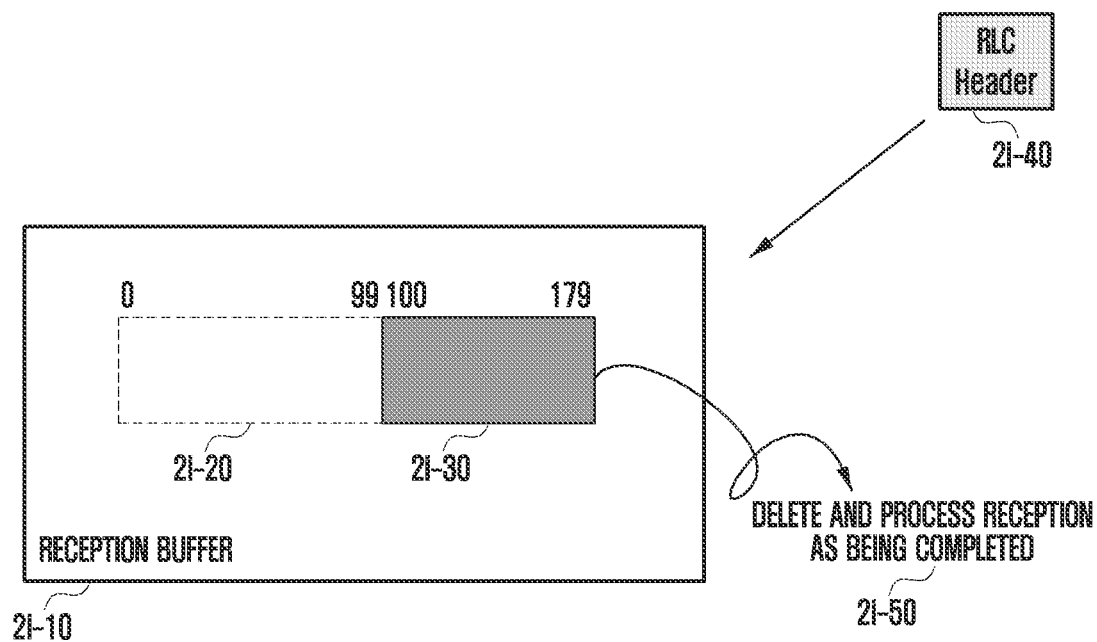
FIG. 2I illustrates an RLC operation of a receiver when a packet from which a data part has been deleted is received according to an embodiment of the disclosure.

FIG. 2I illustrates an RLC operation of a receiver when a packet from which a data part is deleted is received according to an embodiment of the disclosure.

In the example of FIG. 2I, it is assumed that a part of a packet of 180 bytes is stored in an RLC device 2$i$-10 of a receiver. In addition, here, it is assumed that data 2$i$-20 of 0 bytes to 99 bytes have not yet been received, and data 2$i$-30 of 100 bytes to 179 bytes are currently stored in a reception buffer. Here, since not all data of the packet has been received, data received up to then needs to be stored in an RLC reception buffer 2$i$-10. Thereafter, when a packet 2$i$-40, having the same sequence number but no data part, is received in the RLC device of the receiver, the part 2$i$-30 of the packet, stored in the RLC device of the receiver, and the packet 2$i$-40 having only the header and no data part cannot be reassembled together. Therefore, in this case, a part (segment) of the stored packet may be deleted, and reception of the data of the corresponding sequence number may be processed as being completed (indicated by reference numeral 2$i$-50).

In FIG. 2I, it has been assumed that a packet has only an RLC header but no PDCP header and PDCP SDU. However, with respect to the packet having the RLC header and the PDCP header described in FIG. 2C, the stored packet may be discarded and the reception completion processing may be performed in the same manner as above. In addition, the PDCP header may be transmitted to the PDCP device of the receiver to enable processing of the PDCP header by the PDCP device.

Figure 2J:
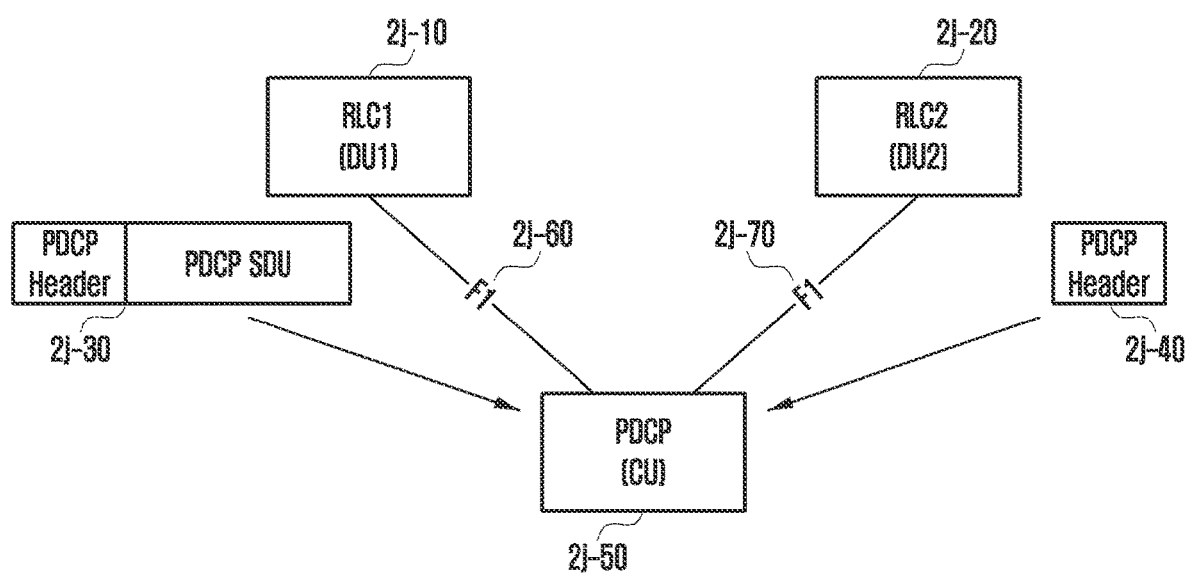
FIG. 2J illustrates an operation of a receiver PDCP layer when a packet from which a data part has been deleted is received according to an embodiment of the disclosure.

FIG. 2J illustrates an operation of a receiver PDCP layer when a packet from which a data part has been deleted is received according to an embodiment of the disclosure.

A protocol stack of a base station may be implemented in a central unit (CU) and a distributed unit (DU) in a separate manner, a higher layer than the PDCP is implemented in a CU 2$j$-50, and a lower layer than the RLC may be implemented in DUs 2$j$-10 and 2$j$-20. In a case of a radio bearer in which duplicate packet transmission is configured, two or more configured RLC devices may be located in different DUs, respectively, and here, the CU and the DUs may be connected through different F1 interfaces 2$j$-60 and 2$j$-70, respectively. In a case where successful transmission is performed in one RLC link when performing duplicate packet transmission, the PDCP device of the transmitter may identify the successful transmission via RLC ACK or HARQ ACK, and may request packet deletion from another RLC device to perform packet deletion. However, as described in FIG. 2C, the data part may be deleted and transmission may be continued.

In the embodiment of FIG. 2J, transmission of a packet 2$j$-30 to RLC1 2$j$-10 is successful, and a packet 2$j$-40, from which a data part is deleted and only a header part is included, is transmitted to RLC2. Here, due to the difference in transmission speed between the F1 interfaces 2$j$-60 and 2$j$-70, the packet 2$j$-40, from which a data part is deleted and only a header part is included, may arrive earlier than the packet including the PDCP SDU, at the PDCP device 2$j$-50 of the CU. In this case, since the packet 2$j$-30 including data (PDCP SDU), transmitted to RLC1 2$j$-10, has not yet arrived, the PDCP device of the CU may not perform packet reception processing even if the packet 2$j$-40, from which the PDCP SDU has been deleted, is received. That is, operations such as updating a PDCP state variable and stopping a reordering timer may not be processed. Thereafter, after receiving the packet 2$j$-30 including the PDCP SDU, the corresponding packet may be processed as being received, and the PDCP SDU may be transferred to a higher layer. That is, the receiver PDCP device may update the PDCP state variable and the like, and may perform reception processing only when a PDCP SDU having a size greater than 0 is received.

Figure 2K:
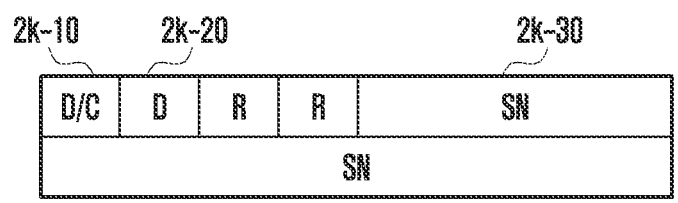
FIG. 2K illustrates a header format including a data part deletion indicator according to an embodiment of the disclosure.

FIG. 2K illustrates a header format including a data part deletion indicator according to an embodiment of the disclosure.

In a case of duplicate packet transmission, if transmission through one logical channel is successful, a data part of a packet stored in another RLC device may be deleted. However, when a packet, from which a data part has been deleted, is received, the receiver may have difficulty in determining whether the data part of the packet is deleted or the packet originally had no data part. To this end, the embodiment of FIG. 2K includes a discard (D) field 2$k$-20 indicating that the data part of the corresponding packet is deleted due to successful packet transmission through one logical channel of duplicate packet transmission. When the receiver receives a packet in which the D field is configured, the receiver may determine that the data part of the packet has been deleted, and may not perform operations such as updating a PDCP state variable or stopping a reordering timer. In addition, a D/C field 2$k$-10 may be a field indicating whether the corresponding packet is a data PDU or a control PDU. In the format of FIG. 2K, since the packet is a data PDU, the D/C field may be configured to have a value indicating the data PDU. An R field corresponds to a reserved field. A SN field 2$k$-30 is a field indicating a sequence number. Although the embodiment of FIG. 2K assumes the PDCP sequence number, the D field may be applied even in the RLC format.

Figure 2L:
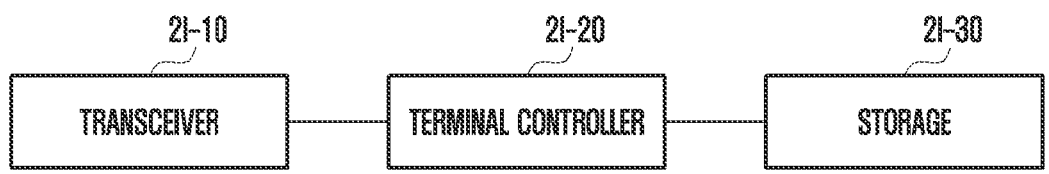
FIG. 2L illustrates the structure of a terminal according to an embodiment of the disclosure.

FIG. 2L illustrates the structure of a terminal according to an embodiment of the disclosure.

Referring to FIG. 2L, the terminal may include a transceiver 2$l$-10, a controller 2$l$-20, and a storage 2$l$-30. In the disclosure, the controller may be defined as a circuit, an application-specific integrated circuit, or at least one processor.

The transceiver 2$l$-10 may transmit or receive signals to or from another network entity. The transceiver 2$l$-10 may receive system information from a base station, for example, and may receive a synchronization signal or a reference signal.

The controller 2$l$-20 may control the overall operation of the terminal according to the embodiment proposed in the disclosure. For example, the controller 2$l$-20 may control a signal flow between blocks to perform an operation according to the flow charts described above.

The storage 2$l$-30 may store at least one of information transmitted or received through the transceiver 2$l$-10 and information generated through the controller 2$l$-20.

Figure 2M:
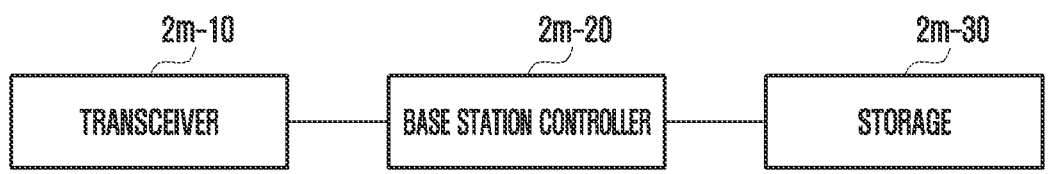
FIG. 2M illustrates the structure of a base station according to an embodiment of the disclosure.

FIG. 2M illustrates the structure of a base station according to an embodiment of the disclosure.

Referring to FIG. 2M, the base station may include a transceiver 2$m$-10, a controller 2$m$-20, and a storage 2$m$-30. In the disclosure, the controller 2$m$-20 may be defined as a circuit, an application-specific integrated circuit, or at least one processor.

The transceiver 2$m$-10 may transmit or receive signals with another network entity. The transceiver 2$m$-10 may transmit system information to the terminal, for example, and may transmit a synchronization signal or a reference signal.

The controller 2m-20 may control the overall operation of the base station according to the embodiment proposed in the disclosure. For example, the controller 2m-20 may control a signal flow between blocks to perform an operation according to the flow charts described above.

The storage 2m-30 may store at least one of information transmitted or received through the transceiver 2m-10 and information generated through the controller 2m-20.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method by a transmitter in a communication system, the method comprising:
generating a first packet and a second packet including the same packet data convergence protocol (PDCP) service data unit (SDU);
transmitting the first packet to a receiver;
identifying that a hybrid automatic repeat request acknowledgement (HARQ-ACK) corresponding to the first packet or a request for toggling a new data indicator (NDI) is received from the receiver; and
deleting a part of the second packet, in case that the second packet is transferred to a medium access control (MAC) layer or the second packet includes a radio link control (RLC) header.

2. The method of claim 1, wherein an entire second packet is deleted, in case that the second packet is not transferred to the MAC layer and the second packet does not include the RLC header.

3. The method of claim 1, wherein the deleting of the part of the second packet comprises one of:
deleting the PDCP SDU included in the second packet; or
deleting the PDCP SDU and a PDCP header included in the second packet.

4. The method of claim 1, further comprising, in case that the second packet includes the RLC header, transmitting the RLC header of the second packet to the receiver.

5. A transmitter in a wireless communication system, the transmitter comprising:
a transceiver; and
a controller configured to:
generate a first packet and a second packet including the same packet data convergence protocol (PDCP) service data unit (SDU),
transmit the first packet to a receiver,
identify that a hybrid automatic repeat request acknowledgement (HARQ-ACK) corresponding to the first packet or a request for toggling a new data indicator (NDI) is received from the receiver, and
delete a part of the second packet, in case that the second packet is transferred to a medium access control (MAC) layer or the second packet includes a radio link control (RLC) header.

6. The transmitter of claim 5, wherein the controller is configured to delete an entire second packet, in case that the second packet is not transferred to the MAC layer and the second packet does not include the RLC header.

7. The transmitter of claim 5, wherein the controller is configured to delete the PDCP SDU included in the second packet, or delete a PDCP header and the PDCP SDU included in the second packet.

8. The transmitter of claim 5, wherein the controller is further configured to, in case that the second packet includes the RLC header, transmit the RLC header of the second packet to the receiver.

9. A method by a receiver in a communication system, the method comprising:
receiving a first packet including a packet data convergence protocol (PDCP) service data unit (SDU) from a transmitter;
transmitting, to the transmitter, a hybrid automatic repeat and request (HARQ) acknowledgment (ACK) corresponding to the first packet or a request for toggling a new data indicator (NDI); and
receiving, from the transmitter, a second packet associated with the same PDCP SDU as the first packet,
wherein the second packet does not include the PDCP SDU, in case that the second packet is transferred to a medium access control (MAC) layer of the transmitter, or the second packet includes a radio link control (RLC) header.

10. A receiver in a communication system, the receiver comprising:
    a transceiver; and
    a controller configured to:
        receive a first packet including a packet data convergence protocol (PDCP) service data unit (SDU) from a transmitter,
        transmit, to the transmitter, a hybrid automatic repeat and request (HARQ) acknowledgment (ACK) corresponding to the first packet or a request for toggling a new data indicator (NDI), and
        receive, from the transmitter, a second packet associated with the same PDCP SDU as the first packet,
    wherein the second packet does not include the PDCP SDU, in case that the second packet is transferred to a medium access control (MAC) layer of the transmitter, or the second packet includes a radio link control (RLC) header.

* * * * *